(12) United States Patent
Jost et al.

(10) Patent No.: US 6,197,987 B1
(45) Date of Patent: Mar. 6, 2001

(54) POLYFUNCTIONAL PERHALOGENATED POLYORGANOSILOXANES AND THE PROCESSES FOR THEIR PREPARATION

(75) Inventors: Philippe Jost, Taluyers; Philippe Karrer, Lyons; Gérard Mignani, Lyons; Philippe Olier, Lyons, all of (FR)

(73) Assignee: Rhone-Bouling Chimie, Courbevoie Cedex (FR)

( * ) Notice: Subject to any disclaimer, the term of this patent is extended or adjusted under 35 U.S.C. 154(b) by 0 days.

(21) Appl. No.: 09/247,099

(22) Filed: Feb. 9, 1999

Related U.S. Application Data

(62) Division of application No. 08/687,044, filed on Jul. 25, 1996.

(30) Foreign Application Priority Data

Jul. 25, 1995 (FR) .................................................. 95 09268

(51) Int. Cl.$^7$ ................................. C07F 7/08; C07F 7/10
(52) U.S. Cl. .................... 556/410; 556/413; 556/427; 556/422; 564/96; 564/97; 564/194; 564/209; 564/207; 560/9; 560/84; 560/87; 560/147
(58) Field of Search ........................... 812/413; 556/427, 556/410, 422; 564/96, 97, 194, 204, 207; 560/9, 84, 87, 147

(56) References Cited

U.S. PATENT DOCUMENTS

| | | |
|---|---|---|
| 3,455,878 | 7/1969 | Quaal . |
| 4,036,807 | 7/1977 | Atherton . |
| 4,384,100 | 5/1983 | Tajanuzawa et al. . |
| 4,748,225 | 5/1988 | Yoshioka et al. . |
| 5,118,775 | 6/1992 | Inomata et al. . |
| 5,140,087 | 8/1992 | Saho et al. . |
| 5,178,959 | 1/1993 | Eckberg et al. . |
| 5,204,436 | 4/1993 | Kishita et al. . |
| 5,233,071 | 8/1993 | Wilczek . |
| 5,236,997 | 8/1993 | Fujiki . |
| 5,244,947 | 9/1993 | Nohr et al. . |
| 5,385,999 | 1/1995 | D'Anvers et al. . |
| 5,426,205 * | 6/1995 | Kirchmeyer et al. ................. 556/422 |
| 5,461,173 * | 10/1995 | Sato et al. ........................ 556/422 X |
| 5,548,054 | 8/1996 | Okada et al. . |
| 5,629,400 | 5/1997 | Standke et al. ........................ 528/38 |

\* cited by examiner

Primary Examiner—Paul F. Shaver
(74) Attorney, Agent, or Firm—Burns, Doane, Swecker & Mathis, L.L.P.

(57) ABSTRACT

The present invention relates to chemically stable, polyfunctional, perfluorinated polyorganosiloxanes (POS) comprising on the one hand fluorinated lateral grafts resulting from the hydrosilylation of perfluorinated olefins with SiH units and having alkyl and/or alkyl ester linkages but not ether linkages, and on the other hand other, non-perfluorinated functional units E capable of giving them diverse and varied physical and chemical properties and opening up avenues in numerous applications.

Examples of these POS according to the invention are those of the following formula:

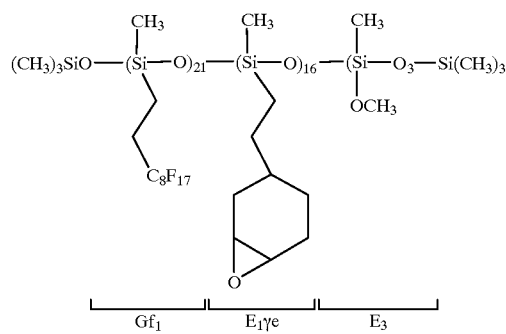

According to another of its features, the invention relates to a process for the preparation of these polyfunctional perfluorinated POS. Applications: antifoams, agents for lowering surface tension, dirt repellents, antiadhesives, lubricants, oleophobic and/or hydrophobic agents, coatings etc.

2 Claims, No Drawings

POLYFUNCTIONAL PERHALOGENATED POLYORGANOSILOXANES AND THE PROCESSES FOR THEIR PREPARATION

This application is a divisional of application Ser. No. 08/687,044, filed Jul. 25, 1996.

The invention relates to (per)halogenated polyorganosiloxanes (POS) derived from (per)halogenated olefins (e.g. α-olefins) by means of a hydrosilylation reaction, it also being possible to present said reaction as the addition of a hydrogenated silicon compound onto a halogenated reactant having one or more ethylenic or alkynylic units of unsaturation.

Without implying a limitation, fluorine is more particularly intended as the halogen.

The present invention thus relates to halogenated—preferably fluorinated—cyclic or non-cyclic (poly) organosiloxanes having at least one silicon atom substituted by at least one halogenated (e.g. fluorinated) radical Rf.

The present invention further relates to a process for the preparation of such compounds.

The role of halogens, particularly fluorine, and the carbon-fluorine bond in providing organic polymer systems with specific properties is well known in polymer chemistry.

It is known in particular that the effects of fluorination, and more precisely of the introduction of perfluorinated units into polymers, are:
to lower the surface energies,
to improve the thermal and chemical stability and
to impart organophobicity and oleophobicity properties.

This type of functionalization by halogenation, and in particular by perfluorination, has been applied to silicone polymers, particularly of the cyclic or non-cyclic polyorganosiloxane type, since the 1970s.

Silicone oils grafted by fluorinated units are thus available which have applications in the textile field as stain or dirt repellents or which can be used as lubricants, as antiadhesives specific for certain adhesives (silicones of high adhesive strength), as grease repellents or else as antifoams. Fluorinated silicone fluids can also be formulated with different thickeners to form mastics or any other sealing and/or jointing materials.

In crosslinked form these fluorinated silicones can be shaped into a variety of engineering parts by molding or extrusion.

For further details on these fluorinated silicones, reference may be made to the article by OGDEN R. PIERCE entitled "Fluorosilicones"—1970— John Wiley & Sons Inc., pages 1 to 15.

A first known strategy for the industrial synthesis of silicones containing perfluorinated units consists essentially in "hydrosilylating" a dihalogenohydrogenoorganosilane, such as $MeHSiCl_2$ (Me=methyl), with an unsaturated compound carrying a perfluorinated unit and having the general formula $CH_2=CH—Rf$ (Rf=perfluorinated unit). The addition of the silane onto this olefin yields a perfluorinated dihalogenoorganosilane, which can be hydrolyzed to produce a functionalized silicone; this can be a cyclic tetramer, for example. It is possible to subject the latter to a redistribution reaction to give a perfluorinated linear polyorganosiloxane (POS). The hydrosilylation reactions which are involved in this kind of synthesis, and which use various combinations of silicone hybrids and perfluorinated olefins, are known to be catalyzed by selected metal compounds, particularly certain group VIII metals such as platinum. Pt/Sn complexes have thus been employed as hydrosilylation catalysts—cf. U.S. Pat. No. 4,089,882 (SHINETSU).

This synthetic strategy appears to be relatively complex and hence expensive.

With a view to industrial simplification, a second synthetic strategy has been proposed which is based on the direct hydrosilylation of a silicone containing SiH units with an α-fluorinated olefin, e.g. of the type $CH_2=CH—Rf$, this perfluorinated unit Rf being attached directly to the olefinic CH by a carbon atom carrying at least one fluorine atom. Here again a variety of group VIII metal catalysts, in particular those based on platinum, are used in this hydrosilylation reaction. It has been found, however, that these catalysts do not afford very high yields. In particular, the conventional industrial hydrosilylation catalysts based on platinum (for example of the KARSTEDT type) are not very efficient. Moreover, it has been observed that substantial amounts of by-product are generated, obviously to the detriment of the perfluorination of the silicones. In these known perfluorinated POS, the radical Rf is joined directly to the Si of the silicone chain. In other words, the linkage in this case corresponds to $—CH_2—CH_2—(CH_2)—_m$ where m=0.

It is these linkages which are used in U.S. Pat. No. 5,233,071. They originate from the hydrosiylation of α-olefins. However, to overcome the deficiencies of the hydrosilylation catalysts used in the prior art, the process described in said patent involves cobalt-based organometallic complexes $[(Co_2CO_8, Co_2CO_6)(PR_3)_3]$, where R=alkyl, aryl]. Such a technical proposal has appeared unsatisfactory because the reaction times obtained are of the order of a few days and it is essential to use a substantial amount of catalyst (1–2%), which is particularly unfavorable in terms of the economics of the process.

One appreciable disadvantage of these cobalt-based complexes is that they catalyze reactions other than hydrosilylation. In particular, they are capable of taking part in polymerization processes involving the rupture of epoxy rings. This lack of specificity is particularly troublesome. Moreover, these are not industrial catalysts.

U.S. Pat. No. 5,348,769 discloses linear or cyclic polyorganosiloxanes comprising siloxy units D substituted by a first perfluorinated functional unit of the formula $—R^3ZRf$, and other siloxy units D carrying a second functional unit of the ether-hydroxyl or alkyl-hydroxyl type. The linkage or bridge joining Si to Rf in the first perfluorinated functional unit consists especially of $—(CH_2)_xZ$, where x=2, 3 or 4 and $Z=NHCO, NHSO_2, O_2C, O_3S, OCH_2CH_3, NHCH_2CH_2$ or $CH_2CHOHCH_2$. The catalyst used is preferably chioroplatinic acid. This is not one of the simplest techniques as it requires the prior preparation of the perfluoroalkylated olefinic reactant. This considerably lengthens the synthesis times and hence increases the cost of the process.

Apart from these linkages whose precursors are perfluoroalkylated α-olefins of the formula $CH_2=CH—Rf$, the technical literature of the prior art also describes bridges whose olefinic precursors are of the type $CH_2=CH—(L)—Rf$, the chemical bond between (L) and Rf being an ester bond. The latter results from the reaction of a carboxyl group with a perhalogenated alcohol, preferably perfluorinated alcohol, and said carboxyl group is generally the hydrolysis product of an acid anhydride.

Thus PCT patent application WO 94/12561 discloses POS grafted by fluorinated units only in the α and ω positions at the ends of the silicone chains. These POS α,ω-perfluorinated on alkyl ester groups do not exhibit optimum properties in respect of surface tension lowering or oleophobicity and hydrophobicity.

European patent application no. 0 640 644 describes perfluorinated (Rf) silicone derivatives which can be used in cosmetic formulations. These perfluorinated silicone derivatives are characterized by siloxy units D carrying three different types of perfluorinated grafts, namely:

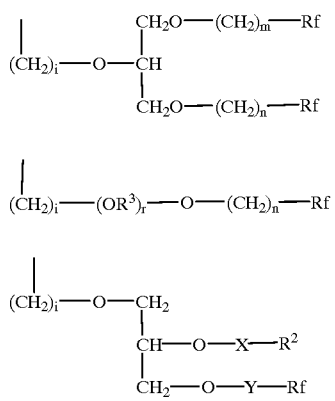

where $R^2$, $R^3$=alkyl, e.g. $CH_3$; $2 \leq i \leq 16$, e.g. i=3; $1 \leq m$, $n \leq 6$; $\leq p \leq 200$; $0 \leq r \leq 50$; the number of siloxy units D grafted in this way is between 1 and 200; and X, Y=single bond, —CO— or $C_1$-$C_6$—alkylene.

A common feature of these perfluorinated grafts (1) to (3) is the presence of ether bonds within the linkage joining the perfluorinated radical Rf to the silicon. Each of these ether bonds represents a possible point of rupture by chemical attack, under certain conditions.

This is a major disadvantage of these known perfluorinated POS because the labile character of the perfluorinated groups is clearly unacceptable in certain applications.

This review of the prior art shows that there are no chemically stable, halogenated—preferably (per) fluorinated—POS which comprise on the one hand fluorinated lateral grafts resulting from the hydrosilylation of perfluorinated olefins with SiH units and having alkyl and/or alkyl ester linkages but not ether linkages, and on the other hand other, non-perfluorinated functional units capable of giving them diverse and varied physical and chemical properties and opening up avenues in numerous applications.

Furthermore, the prior art contains even fewer disclosures of such POS which can be obtained in a simple, economic and hence perfectly industrial manner.

Under these circumstances, one of the essential objects of the present invention is to overcome this deficiency of such halogenated—preferably (per)fluorinated—POS and preferably to provide novel perfluorinated POS possessing a first type of non-perfluorinated functional grafts and a second type of perfluorinated bifid grafts each having one or two parallel perfluorinated chains, said POS thus having a crystalline character which makes them particularly suitable for application as dirt repellents.

Another essential object of the invention is to provide a process for the preparation of halogenated—preferably (per) fluorinated—POS, this process being of the type in which at least one halogenated (e.g. fluorinated) olefin and at least one olefinic precursor having, or capable of having, a different functional group from the fluorinated grafts are reacted with a POS containing at least one SiH unit, in the presence of an effective amount of catalyst, according to a hydrosilylation mechanism, it being necessary for said process to use available or easily preparable starting materials and also to be based on a methodology which is simple to put into effect, does not require sophisticated equipment and makes it possible to achieve high performance characteristics in terms of the yield and purity of the final perfluorinated POS.

Another essential object of the invention is to offer a perhalogenation (perfluorination) process of the above-mentioned type which is characterized by excellent hydrosilylation kinetics and by a high degree of conversion of the SiH units to SiRoRf units, where Ro=divalent bridge and Rf=perfluorinated unit.

Another essential object of the present invention is to provide a process for the perhalogenation—preferably (per) fluorination—of SiH-carrying POS which allows the use of traditional hydrosilylation catalysts that are simple to manipulate and inexpensive, for example of the platinic type (KARSTEDT), without sacrificing the essential requirements of optimum efficiency, yield, purity of the final products and specificity.

Another essential object of the invention is that the above-mentioned process makes it possible simply and economically to obtain perfluorinated POS (e.g. silicone oils) which are at least difunctional.

These and other objects are achieved by the present invention, which relates principally to novel perhalogenated—preferably perfluorinated—POS and to a novel perhalogenation—preferably perfluorination—process involving the hydrosilylation of SiH-carrying POS, said process being one of those which make it possible to obtain the above-mentioned novel POS.

The present invention therefore relates firstly to (per) halogenated—preferably (per)fluorinated—polyorganosiloxanes (POS) of the following general formulae (I) and (II):

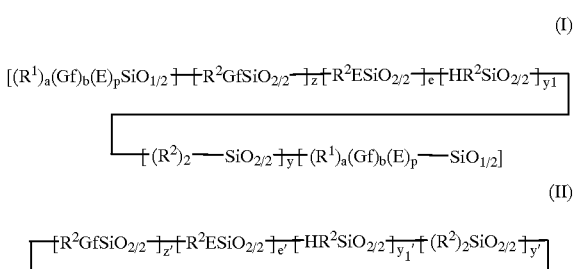

in which:
a+b+p=3; a=2 or 3; b, p=0 or 1;
z is between 0 and 200, preferably between 1 and 90;
$y_1$ is between 0 and 10, preferably between 0 and 5;
y is between 0 and 50, preferably between 0 and 25; and
e is between 1 and 200, preferably between 1 and 90,
with the provisos that:
  Δ if z≠0, then $5 \leq z+y_1+y+e \leq 200$, preferably $10 \leq z+y_1+y+e \leq 100$ and $[z/(z+y+y_1+e+2)].100 \geq 3$, preferably 5;
  Δ if z=0, then $5 \leq y+y_1+e \leq 100$, b being other than 0 in at least one of the monovalent terminal siloxy units M;
  Δ if e≠0, then $5 \leq z+y_1+y+e \leq 200$, preferably $10 \leq z+y_1+y+e \leq 100$ and $[z/(z+y+y_1+e+2)].100 \geq 3$, preferably 5; and
  Δ if e=0, then $5 \leq y+y_1+z \leq 100$, p being other than 0 in at least one of the units M;
$1 \leq z' \leq 9$, preferably $1 \leq z' \leq 4.5$;
$0 \leq y'_1 \leq 0.5$, preferably $0 \leq y'_1 \leq 0.25$;
$0 \leq y' \leq 5$, preferably $0 \leq y' \leq 0.5$;
each radical $R^1$, $R^2$ on the one hand is identical to or different from like radicals of the same exponent and the other radical of different exponent, and on the other hand is a linear or branched $C_1$–$C_{12}$—(cyclo)alkyl— preferably $C_1$–$C_6$—(cyclo)alkyl—group, an aryl, an aralkyl or an alkylaryl, these groups optionally being substituted;

Gf is an optionally halogenated—preferably (per) fluorinated—functional monovalent radical of identical or different type in the z or z' siloxy units D and/or the two siloxy units M in which it is present, and having the following average formula:

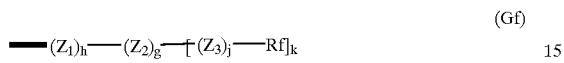

(Gf)

Δ where $h=0$ or 1; $g=1$; $j=0$ or 1 and $k=1$ or 2;

Δ with the proviso that at least one radical Gf is present in said POS (I) or (II), the radicals Gf preferably being present to the extent of at least 60 mol %;

Δ $Z_1$ being a divalent radical of the formula

where $m \geq 2$, with the proviso that if $m=2$, then at least some of the radicals Gf are radicals in which $g \neq 0$;

Δ $Z_2$ being a mono-, di- or tri-valent radical of the formula

.α.

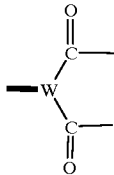

one or both of the free valences of the carbonyl(s) being joined to —$Z_3$Rf and, in the case where only one of said free valences is joined to —$Z_3$Rf, the other then being joined to a hydroxyl;

.β.

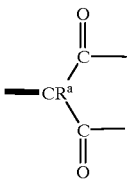

at least one of the free valences of the carbonyls being joined to —$Z_3$—Rf and, in the case where only one of these free valences is joined to —$Z_3$—Rf, the other then being joined to a linear or branched $C_1$–$C_6$— alkoxy; and $R^a$=H, aryl or linear or branched $C_1$—$C_6$—lower alkyl, preferably $CH_3$;

.γ.

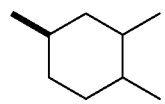

.δ.

—W—NH—CO—

.ε.

.η.

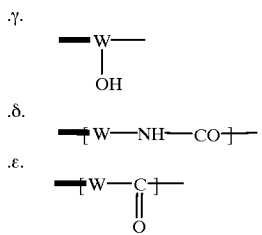

$h=0$ in Gf;

one or both of the free valences of the carbonyl(s) being joined to —$Z_3$—Rf and, in the case where only one of said free valences is joined to —$Z_3$Rf, the other then being joined to a hydroxyl or to a linear or branched $C_1$–$C_6$-alkoxy;

.θ.

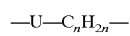

one or both of the two free valences other than the valence—being joined to —$Z_3$—Rf and, in the case where only one of these two valences is joined to —$Z_3$—Rf, the other then being joined to OH or to a linear or branched $C_1$–$C_6$-alkoxy; or

.λ.

—Si(R^b)(/)(\)

one or both of the two free valences other than the valence—being joined to —$Z_3$—Rf and, in the case where only one of these two valences is joined to —$Z_3$—Rf, the other than being joined to OH or to a linear or branched $C_1$–$C_6$-alkoxy;

$R^b$=H or linear or branched $C_1$–$C_6$-lower alkyl, methyl being preferred;

→ W being a cyclic or non-cyclic hydrocarbon radical, in particular an aliphatic and/or alkenyl and/or alkynyl and/ or aromatic radical, and W also being devoid of an ether link —O—;

Δ is a divalent radical of the formula

—U—$C_nH_{2n}$— where $n \leq 1$ and U=O, S, NH or $NHSO_2$, preferably O; and

Δ Rf being a perhalogenated—preferably perfluorinated— radical and particularly preferably a linear or branched perfluoroalkyl radical having one of the following formulae:

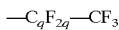

where $q \geq 0$;

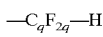

where $q \geq 1$;

where $q \geq 0$ and $R^{rf}$=H, aryl or linear or branched $C_1$–$C_6$-lower alkyl (preferably $CH_3$); and

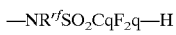

where $q \geq 1$ and $R^{rf}$ is as defined above;

E is a monovalent functional radical, other than Gf defined above, of identical or different type in the e or e' siloxy units D and/or the two siloxy units M in which it is present, and preferably chosen from the groups having at least one of the following functional groups $E_1$ to $E_{13}$:

Δ $E_1$=

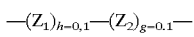

in which:
* $Z_1$ is defined in the same way as given above for Gf where $m \geq 2$; and
* $Z_2$ corresponds to:

.αe.

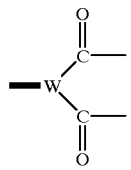

where at least one of the free valences of a carbonyl is bonded to an OH, or else these two free valences are both joined to the same oxygen atom;

.βe.

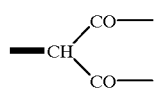

where the two free valences of the carbonyls are each bonded to a linear or branched $C_1$–$C_6$-alkoxy;

.γe.

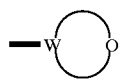

.δe.

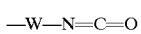

or

.εe.

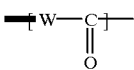

the free valence of the carbonyl being joined to a linear or branched $C_1$–$C_6$-alkoxy or else to an OH;

.ηe.

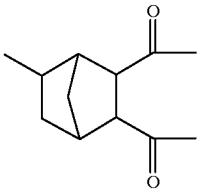

where at least one of the free valences of a carbonyl is bonded to an OH or a linear or branched $C_1$–$C_6$-alkoxy, or else these two free valences are both joined to the same oxygen atom;

.θe.

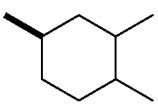

one or both of the two free valences other than the valence—being joined to $Z_3$—Rf and, in the case where only one of these two valences is joined to $Z_3$—Rf, the other then being joined to OH or to a linear or branched $C_1$–$C_6$-alkoxy; or .λe.

$R^b$=H or linear or branched $C_1$–$C_6$-lower alkyl, methyl being preferred;
* $Z_1$ and $Z_2$ being identical to or different from their counterparts present in Gf and described above; and
* W being as defined above for Gf; and Δ $E_2$=amine; $E_3$=alkoxy; $E_4$=acyl; $E_5$=acyloxy; $E_6$=hydroxyl; $E_7$=trialkoxysilyl; $E_8$=amide; $E_9$=ester; $E_{10}$=phenol; $E_{11}$=aryl-alkoxy; $E_{12}$=aryloxy; $E_{13}$=ether-hydroxy.

It is to the credit of the Applicant to have produced these novel (per)halogenated—preferably (per)fluorinated—POS by the careful selection on the one hand of different species of grafts Gf perfluorinated by Rf, and on the other hand of at least one second functional group carried by lateral grafts E belonging to one or more species which are different from one another but in particular different from Gf due to their lack of perfluorinated radicals.

According to the invention, the species of grafts Gf to be considered in particular are:
those with an alkylene linkage —$(C_mH_{2m})$— where $m \geq 2$;
those with an alkylene linkage $(C_mH_{2m})_{m+2}$ ($m \geq 0$) extended by a divalent or trivalent hydrocarbon radical W devoid of an ether —O—, and having one or more perfluorinated radicals Rf;

those with an alkylene linkage $(C_mH_{2m})_m$ (m>2) extended either by W ω-hydroxylated and alkoxylated by a radical whose free end is Rf, or by W alkoxylated by two radicals carrying Rf;

those with an alkylene linkage —$(C_mH_{2m})$— (m>0) extended by a divalent or trivalent radical belonging to the general family of the radicals W and joined to or forming part of a cyclic unit whose free valence(s), other than that joined to Si, bonds (bond) with any radical(s) $Z_3Rf$ and/or with alkyl, alkoxy or hydroxyl substituents;

those with an alkylene linkage —$(C_mH_{2m})$— (m>0) extended by a trivalent silyl radical in which the free valences, other than that joined to Si, bond with any radical(s) $Z_3Rf$ and/or with alkyl, alkoxy or hydroxyl substituents; and finally those with a linkage not containing a divalent alkylene radical (h=0) but having a radical W directly connected to Si, and also carrying at least one radical Rf.

All these grafts perfluorinated by Rf have the advantage of being chemically stable.

Another major advantage of the grafts according to the invention is that they can be obtained with the aid of industrial catalysts, for example those based on platinum, such as the KARSTEDT catalyst. Apart from the fact that they are used in small amounts, these catalysts are intrinsically economic, thereby contributing to a reduction in the cost of the novel perhalogenated (perfluorinated) silicon compounds according to the invention.

This cost is all the lower because the structure of the linkage affords rapid hydrosilylation kinetics, high yields and high degrees of conversion of the SiH units to SiGf units.

In practice the monovalent radical Rf corresponds to —$C_qF_{2q}$—$CF_3$, where q is between 2 and 20, preferably between 5 and 12 and particularly preferably between 7 and 10. In practice it is also possible to use e.g. mixtures of Rf in which q=7, 8 and 9.

According to one advantageous provision of the invention, the fluorinated polyorganosiloxanes to which it relates comprise one or more grafts Gf in which:

h=0 or 1 and g=1, $Z_2$ comprising a group W corresponding to a substituted or unsubstituted, saturated, unsaturated or aromatic monocyclic or polycyclic radical preferably selected from the following rings:

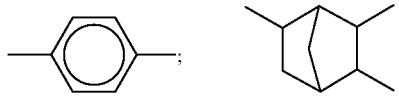

One of the essential characteristics of the POS of the invention is therefore that they carry one or more functional radicals E which are of different type and are preferably grafted onto siloxy units D, said radicals E being selected for example from the following groups:

an epoxy-functional group $E_1$ preferably selected from the following groups: 3-glycidoxypropyl and 4-ethanediyl (1,2-epoxycyclohexyl);

and/or an isocyanate group $E_1$ preferably selected from the following groups:

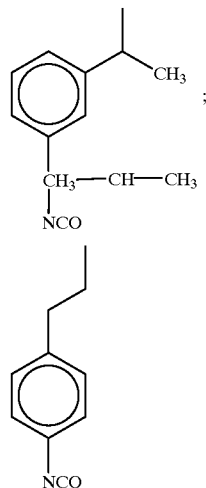

and/or an amino-functional group $E_2$ preferably selected: either from the following groups:

$NH_2$—$(CH_2)_2$—$NH$—$(CH_2)_3$—; $NH_2$—$(CH_2)_3$—;

or from secondary or tertiary amine groups forming part of a cyclic hydrocarbon chain (hals), of the formula:

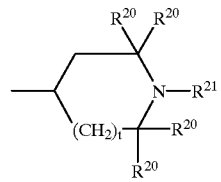

in which:

∇ the radicals $R^{20}$, which are identical to or different from one another, are selected from linear or branched alkyl radicals having from 1 to 3 carbon atoms, phenyl radicals and benzyl radicals;

∇ $R^{21}$ is selected from a hydrogen atom, linear or branched alkyl radicals having from 1 to 12 carbon atoms, alkylcarbonyl radicals in which the alkyl radical is a linear or branched radical having from 1 to 8 carbon atoms, phenyl and benzyl radicals and a radical O;

∇ t is a number selected from 0 and 1;

∇ the preferred radicals $R^{20}$ being methyls, the radical $R^{21}$ being a hydrogen atom or a methyl radical and t advantageously being a number equal to 1; and/or ∇ a hydroxy-functional group $E_6$ preferably selected from the following groups: 3-hydroxypropyl and 3-(2-hydroxyethoxy)propyl.

These other functional groups $E_1$ to $E_{13}$, which are e.g. different from the perfluorinated grafts Gf, offer the possibility of constructing perfluorinated silicones possessing other functional groups, both multiple and varied. This is of particular value from the point of view of adapting each POS specifically to a given application.

It is clear that, in view of their chemical reactivity, the grafts E can in certain cases be precursors of perfluorinated pendent groups, especially of the type Gf. These are then supports for the connection of radicals Rf or, in other words, potential precursors of Rf attachment linkages (Rf prelinkages), e.g. anhydrides, carboxyls, alcohols, isocyanates, etc. Naturally, however, the possible substitutions are not restricted to perfluorinated groups. It is possible to consider fixing any reactive group (crosslinking) to the grafts E.

According to one preferred modality of the invention, the POS are linear and have the following average formula (I.1):

$$[(H)_{d1}(R^1)_{c1}SiO_{1/2}]\!\!-\!\![R^2GfSiO_{2/2}]_z\!-\![R^2ESiO_{2/2}]_e\!-\![HR^2SiO_{2/2}]_{y_1}\!-\![(R^2)_2\!-\!SiO_{2/2}]_y\!-\!(H)_{d2}(R^1)_{c2}SiO_{1/2}] \quad (I.1)$$

in which:

Gf corresponds to the definition given above where h=g=1 or h=1 and g=0;

E=$E_1$ to $E_{13}$;

$R^1$ and $R^2$ are as defined above, preferably methyl, propyl or butyl;

c1+d1=3 and preferably c1=2, d1=1;

c2+d2=3 and preferably c2=2, d2=1;

$1 \leq z \leq 90$, preferably $1 \leq z \leq 50$;

$1 \leq e \leq 100$, preferably $1 \leq e \leq 60$;

$0 \leq y_1 \leq 10$, preferably $0 \leq y_1 \leq 5$;

$0 \leq y \leq 50$, preferably $0 \leq y \leq 25$.

Even more preferably, the POS (I) according to the invention are perfluorinated linear polymers of the following formula (I.1.1):

$$R^\alpha SiO\!-\!(SiO)_y\!-\!(Si)_{y_1}\!-\!(SiO)_z\!-\!(SiO)_e\!-\!SiR^\omega$$

(with CH$_3$ groups on Si, H, Gf, E substituents)

where y, $y_1$, z, e, Gf and E are as defined above and R and $R^\omega$, which are identical or different, are H or $C_1$–$C_6$-alkyl.

According to one variant of the invention, the POS (I) are shorter polymers or even oligomers of the following formula (I.1.2):

$$[(Gf)_{b1}(R^1)_{a1}SiO_{1/2}]\!-\![R^2Gf\,SiO_{2/2}]_p\!-\![(R^2)_2SiO_{2/2}]_y\!-\![(R^1)_{a2}(Gf)_{b2}SiO_{1/2}] \quad (I.1.2)$$

in which:

+ Gf is as defined above;

+ $R^1$, which is identical to or different from like radicals of the same exponent, is $R^1$ as defined in claim 1, or else corresponds to a functional group (E) as defined above, preferably an epoxy-functional radical;

+ $R^2$, which is identical to or different from like radicals of the same exponent, is defined in the same way as above;

+ a1+b1=a2+b2=3;

a1,a2=2 or 3; b1, b2=0 or 1;

$0 \leq y \leq 100$, preferably $0 \leq y \leq 10$;

$0 \leq p \leq 50$, preferably $0 \leq p \leq 5$;

→ the formula in which $R^1$=CH$_3$, b1=1 and b2=0, $$Gf\!:\!-\!(CH_2)_3\!-\!CH\!\!\begin{array}{c}COR^{10}\\COR^{11}\end{array}$$

where $R^{10}$ and $R^{11}$ are identical or different and are OH, $C_1$–$C_6$-alkoxy or $Z_3Rf$ according to claim 1, at least one of the radicals $R^{10}$ and $R^{11}$ being $Z_3Rf$, p=0 and y=0 or 1, → and the formula in which $R^1$=CH$_3$, b1=b2=0, $$Gf\!:\!-\!(CH_2)_3\!-\!CH\!\!\begin{array}{c}COR^{10}\\COR^{11}\end{array}$$

y=0 and p=1 to 10, preferably 1,

→ being particularly preferred.

The following oligomers are examples of these POS (I.1.2):

$$Me_3SiO\!-\!(SiO)\!-\!SiMe_3$$
(with Me substituent and a chain ending in)
$$O\!=\!C\quad C\!=\!O$$
$$OEt\quad O(CH_2)_2C_8F_{17}$$

$$F_{17}C_8\!-\!\cdots\!-\!SiMe_2OSiMe_2\!-\!H$$

$$Rf\quad Rf\!-\!\cdots\!-\!SiMe_2OSiMe_2\!-\!H$$
(with a malonate-type structure)

-continued

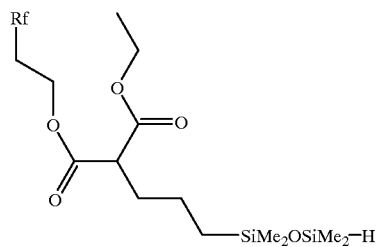

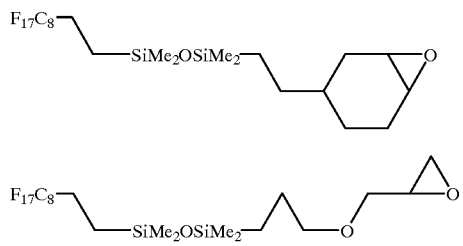

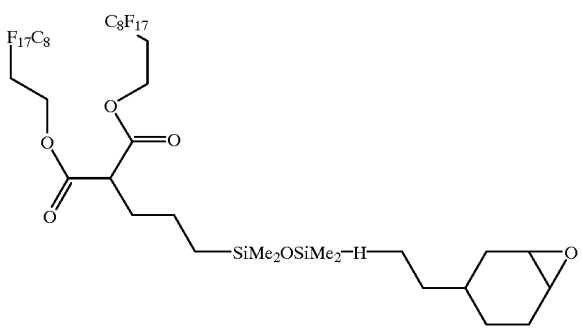

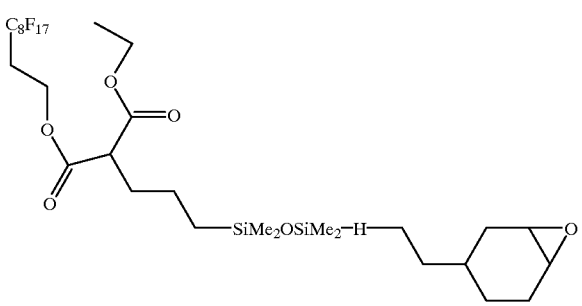

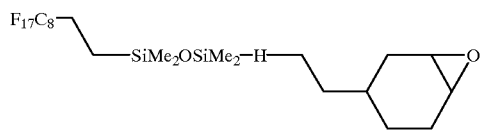

Advantageously Gf is selected from the following list of groups:

.a.

where $m \geq 2$, $h=1$, $g=0$, $j=0$ and $k=1$;

.b.

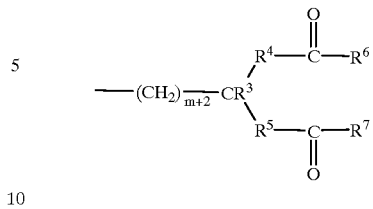

where:
   $h=1$, $m \geq 0$, $g=1$, $j=0$ or 1 and $k=1$;
   $R^3$=H or $C_1$–$C_6$-alkyl;
   $R^4$ and $R^5$ are identical to or different from one another and correspond to —$(CH_2)$—$_{u \geq 0}$; and
   $R^6$ and $R^7$ are identical to or different from one another and are $Z_3$—Rf, where $Z_3$=—O—$(CH_2)$—$_s$, s being between 0 and 10, at least one of these two radicals $R^6$ and R7 corresponding to $Z_3$—Rf;

.c.

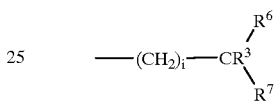

where:
   $h=1$, $m \geq 0$, $g=1$, $j=0$ or 1, $k=1$ and $i=2$ to 10; and
   $R^3$, $R^6$ and $R^7$ are as defined above;

.d.

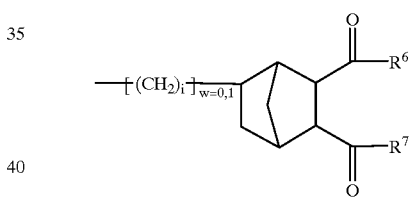

where:
   $h=0$ or 1, $m \geq 0$, $g=1$, $i=2$ to 10, $j=1$ and $k=1$; and
   $R^6$ and $R^7$ are as defined above;

.e.

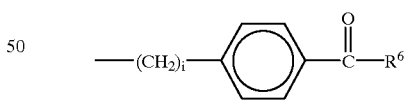

where:
   $h=1$, $m \geq 0$, $g=1$, $i=2$ to 10, $j=0$ or 1 and $k=1$; and
   $R^6$ is as defined above; and .f. mixtures thereof.

According to the invention, a subgroup of particular grafts Gf called "bifid grafts" are considered which are very especially preferred for the remarkable characteristics which they are capable of imparting to the POS onto which they are grafted. The invention therefore further relates to POS of the type defined above which comprise at least one species (I) and/or (II) substituted by at least one perhalogenated—preferably perfluorinated—radical Gf selected from the following subgroup of radicals:

→ (i)

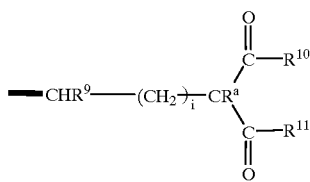

where:
- ○ $R^a$ and $R^9$ independently are H or linear or branched $C_1$–$C_6$-lower alkyl, preferably $CH_3$;
- ○ $R^{10}$ and $R^{11}$ independently are OH, linear or branched $C_1$–$C_6$-alkoxy or $Z_3$–Rf, at least one of the radicals $R^{10}$ and $R^{11}$ being -$Z_3$Rf; and ○ i=0 to 10, preferably 0 to 3 and particularly preferably 1;

→ (ii)

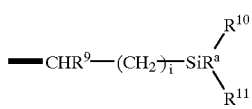

where $R^9$, $R^a$, $R^{10}$, $R^{11}$ and i are as defined above;

→ (iii)

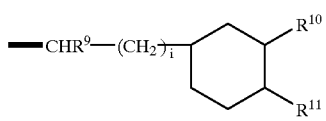

where $R^9$, $R^{10}$, $R^{11}$ and i are as defined above, it optionally being possible for the hexyl ring to be substituted; and → mixtures of the above-mentioned radicals.

At this stage of the disclosure it is appropriate to dwell for a moment on the particularly interesting species of POS compounds according to the invention which is represented by the perhalogenated—perfluorinated—POS carrying bifid grafts Gf as defined above. More precisely, the bifid Gf of interest here are those in which the two lobes each consist of a perhalogenated—perfluorinated—radical $Z_3$Rf. These bisperfluorinated bifid grafts Gf are crystalline and, in particular, impart a degree of crystallinity to the POS which they substitute. This optimizes the water-repelling properties of the latter, which thus make very suitable active products in dirt-repelling compositions, inter alia.

These bifluorinated bifid grafts Gf can be associated especially with monoperfluorinated and/or non-perfluorinated bifid Gf.

The POS of this species comprise at least one species (I) and/or (II) substituted by:
- ○ at least one perhalogenated—preferably perfluorinated—radical Gf of formula (i), (ii) or (iii) above, the radicals $R^{10}$ and $R^{11}$ in the formula in question corresponding to $Z_3$Rf and preferably to:

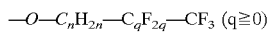

or

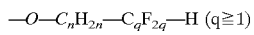

- ○ and optionally at least one radical Gf (i), (ii) or (iii) in which one of the radicals $R^{10}$ or $R^{11}$ is $Z_3$Rf and the other radical $R^{10}$ or $R^{11}$ is different from $Z_3$Rf and advantageously corresponds to OH or linear or branched $C_1$–$C_6$-alkoxy.

During the synthesis, those skilled in the art are perfectly capable of controlling the degrees of substitution of the POS of this species by bisperfluorinated and/or monoperfluorinated and/or non-perfluorinated bifid Gf. It is the intended applications of the grafted POS which determine how these degrees of substitution should be regulated.

Within this species the bifid Gf with an alkylmalonyl linkage (i) are chosen more especially in practice.

By analogy with the bifid grafts Gf described above, the grafts E can be constructed on the same structure. As a result, another advantageous characteristic of the POS according to the invention can be that they comprise at least one species (I) and/or (II) substituted by at least one radical E selected from the subgroup of radicals E (i), (ii) and (iii) corresponding to the radicals Gf (i), (ii) and (iii), respectively, as defined above, the only difference being that $R^{10}$ and $R^{11}$ are identical or different and correspond only to OH and linear or branched $C_1$–$C_6$-alkoxy.

All these grafts Gf and E impart novelty and great technical value to the POS to which they are attached.

On the basis of the details given above in respect of the POS according to the invention and their grafts Gf and E, it can be deduced that the preferred POS according to the invention are e.g. poly(dimethyl,methyl-perfluoroalkyl) siloxanes or poly(methylalkyl,methylperfluoroalkyl) siloxanes where the first alkyl group is propyl, butyl, pentyl, hexyl etc.

Certain linear perfluorinated POS compounds of average formula (I.1), (I.1.1) and (I.1.2) naturally have their cyclic counterparts of average formula (II0.1); in this case, however, the sum of $z'+y'_1+y'+e'$ is less than or equal to 10, preferably 5.

According to an optional but nevertheless advantageous provision of the invention, the POS contain, per molecule:
at least one siloxy unit T and also siloxy units T=—[$R^8SiO_{3/2}$], where $R^8$ is defined in the same way as $R^1$, $R^2$, Gf or E, as given above,
and optionally siloxy units Q=[$SiO_{4/2}$].

As far as the functional characteristics of the products according to the invention are concerned, it is necessary to emphasize the fact that the monofunctional or polyfunctional fluorinated polyorganosiloxanes described above have notable properties of surface tension lowering and oleophobicity and/or hydrophobicity, inter alia. These properties can be adjusted by controlling the proportions of grafted or non-grafted units D present in the fluorinated POS. This corresponds to the molar proportions z, z', $y_1$, $y'_1$, y, y', e and e' given by the formulae defined above.

It should be noted that m values of 1 or 2 in $Z_1$ of Gf guarantee that the fluorinated POS in question will have a good heat stability. This property can be advantageous especially in the context of application of the fluorinated POS as lubricants.

It is also interesting to observe that, in the case where the fluorinated POS comprise an amino functional group $E_4$ on a unit D or optionally T, this is not without positive repercussions on the coefficient of friction of the oil in question. This again is an advantage which can be exploited in lubrication.

According to one variant of the invention, the functional group or groups E can optionally be carried by units M or T.

The fluorinated POS according to the invention can take the form of oils of greater or lesser viscosity, but can also take the form of resins Q and/or resins resulting from the crosslinking of linear or cyclic POS chains via crosslinking functional groups which can be present in these chains.

The invention further relates to a process for the preparation of cyclic or linear halogenated—preferably (per) fluorinated—POS, which consists essentially in reacting:

A) at least one polyalkylhydrogenosiloxane—preferably polymethylhydrogenosiloxane—oil
B) with at least one (per)halogenated—preferably (per) fluorinated—olefin which is a precursor of Gf and has the formula (Gf$_p$):

$$Z_{1p}Rf$$

in which:
$Z_{1p}$=olefinic precursor of $Z_1$ and
Rf is as defined above,
C) and/or with at least one (per)halogenated—preferably (per)fluorinated—olefin of the formula $Z_{1p}Z_{2p}$, in which:
$Z_{1p}$=olefinic precursor of $Z_1$ and
$Z_{2p}$=olefinic precursor of $Z_2$,
D) in the presence of an effective amount of a metal hydrosilylation catalyst preferably based on platinum, the reaction product A+C optionally being brought into contact with a reactant of the type $Z_{3p}Rf$, where $Z_{3p}$ is a precursor of $Z_3$ and Rf is as defined above, to give grafts Gf=—$Z_1Rf$ and/or —$Z_1Z_2Z_3Rf$,
E) and finally with a reactant $E_p$ formed by an olefinic precursor of E, $E_p$ being capable of hydrosilylation by the ≡SiH of the POS in the presence of D.

The precursor radicals of the radicals present in the final POS are identified by the subscript "p" following the subscript(s) already indicated.

According to one variant, the precursor $E_p$ is of the type $Z_{1p}Z_{2p}$, where $Z_{1p}$ is an olefinic precursor of $Z_1$ and $Z_{2p}$ is a precursor of $Z_2$, and $Z_1$, $Z_2$, $Z_{1p}$ and $Z_{2p}$ are identical to or different from their counterparts present in Gf and described above.

In this mode of carrying out the invention, the radicals —$Z_1Z_{2p}$ grafted onto the POS are brought into contact with at least one reactive compound carrying a group having at least one functional group E, so as to produce grafts —$Z_1Z_2E$.

In the case where $Z_{2p}$ of the anhydride type are involved, it is possible to envisage hydrolyzing at least some of these anhydride groups so as to generate free carboxyl ends, and then esterifying at least some of said carboxyl ends with reactants of the type $Z_{3p}$—Rf, $Z_{3p}$ being a hydrogenated precursor of $Z_3$, as defined above, and Rf also being as defined above. The remaining free carboxyl ends form part of the grafts E. Instead of or in addition to the reactants $Z_{3p}$—Rf, it is possible to employ at least one reactive compound carrying a group having at least one functional group E.

In another variant, the procedure is to preconstruct a global olefinic precursor radical Gf$_p$ and/or $E_p$, which is then fixed to the POS.

In other words, this variant consists essentially in reacting:

A) at least one polyalkylhydrogenosiloxane—preferably polymethylhydrogenosiloxane —oil
F) with at least one halogenated—preferably (per) fluorinated—olefin which is a precursor of Gf and has the formula (Gf$_p$):

$$(Z_{1p})_h—(Z_2)_g—[(Z_3)_j—Rf]_k$$

in which:
$Z_{1p}$ is the olefinic precursor of the radical $Z_1$, as defined above, and
$Z_2$, $Z_3$, Rf, h, g, j and k are also as defined above, with the proviso that if h=0, then g=1 and $Z_2$ becomes an olefinic precursor $Z_{2p}$,
G) and/or with at least one olefinic precursor $E_p$ of E,
D) in the presence of an effective amount of a metal hydrosilylation catalyst preferably based on platinum.

The precursor Gf$_p$ of Gf preferably has at least one of the following formulae:

(i$_p$)

$$CH_2=CR^9—(CH_2)_i—CR^a\begin{array}{c}\diagup C(=O)—R^{10}\\ \diagdown C(=O)—R^{11}\end{array}$$

where $R^a$ and $R^9$ independently are H or linear or branched $C_1$–$C_6$-lower alkyl, preferably $CH_3$;
$R^{10}$ and $R^{11}$ independently are OH, linear or branched $C_1$–$C_6$-alkoxy or $Z_3$—Rf; and
i=0 to 10, preferably 0 to 3 and particularly preferably 1;

(ii$_p$)

$$CH_2=CR^9—(CH_2)_i—SiR^a\begin{array}{c}\diagup R^{10}\\ \diagdown R^{11}\end{array}$$

where $R^9$, $R^a$, $R^{10}$, $R^{11}$ and i are as defined above; and (iii$_p$)

$$CH_2=CR^9—(CH_2)_i—\text{[cyclohexyl]}\begin{array}{c}R^{10}\\ R^{11}\end{array}$$

where $R^9$, $R^{10}$, $R^{11}$ and i are as defined above, it optionally being possible for the hexyl ring to be substituted.

These olefinic precursors Gf$_p$ of the bifid grafts Gf have one or two perfluorinated groups $R^{10}$, $R^{11}$ ($R^{10}$ and/or $R^{11}$=$Z_3$Rf) and are obtained by reacting:
→ at least one alcohol consisting of the hydrogenated radical $Z_3$Rf, or H—$Z_3$Rf, i.e. H—O—$C_nH_{2n}(X)_{x=0\ or\ 1}$Rf according to claim 1,
→ with starting materials formed by compounds of formula (i$_p$), (ii$_p$) or (iii$_p$), as defined in claim 11, in which at least one of the radicals $R^{10}$ and $R^{11}$ is a linear or branched $C_1$–$C_6$-alkoxy, according to a transesterification mechanism.

As far as the olefinic precursors $E_p$ of the bifid grafts E are concerned, each of them preferably has at least one of formulae (i$_{ep}$), (ii$_{ep}$) and (iii$_{ep}$) corresponding respectively to formulae (i$_p$), (ii$_p$) and (iii$_p$) given in claim 13 for Gf$_p$, the only difference being that $R^{10}$ and $R^{11}$ are identical or different and correspond only to OH or linear or branched $C_1$–$C_6$-alkoxy.

The present invention further relates to novel synthons (reaction intermediates of the process described above), each synthon having at least one of the following formulae:

($i_p$)

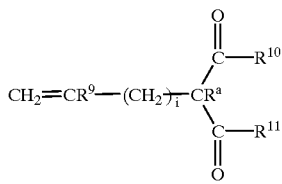

where $R^a$ and $R^9$ independently are H or linear or branched $C_1$–$C_6$-lower alkyl, preferably $CH_3$; and at least one of the radicals $R^{10}$ and $R^{11}$ corresponds to a linear or branched $C_1$–$C_6$-alkoxy, methoxy, ethoxy and propoxy being preferred;

($ii_p$)

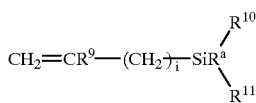

where $R^9$, $R^a$, $R^{10}$, $R^{11}$ and i are as defined above; and ($iii_p$)

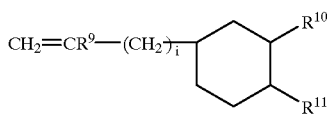

where $R^9$, $R^{10}$, $R^{11}$ and i are as defined above, it optionally being possible for the hexyl ring to be substituted.

One of the major advantages resulting from the use of perfluorinated or non-perfluorinated unsaturated compounds of this type ($Z_{1p}$, $Z_{2p}$, $Gf_p$, $E_p$) lies in the possibility of using an industrial catalyst selected from compounds based on Ni, Pd or Pt, preferably based on Pt. This can be a KARSTEDT catalyst, for example, which is advantageously employed in small amounts, e.g. of the order of 10 to 50 ppm, relative to the POS in question, before hydrosilylation (Si—H oil).

The methodology determined by the process according to the invention is particularly simple. The hydrosilylation kinetics are rapid. The yield and the degree of conversion of the SiH are particularly high. The process is efficient and economic.

According to a preferred modality of the invention, the POS containing≡SiH units is gradually brought into contact with one or more halogenated olefins $Gf_p$ and the olefinic precursors $E_p$ of the grafts E. The catalyst is contained in one or more of these three constituents POS, $Gf_p$ and $E_p$ of the reaction medium.

In practice the hydrosilylation takes place in as many stages as there are different olefinic reactants.

The reaction medium is stirred and heated to a temperature between 50 and 150° C. The reaction takes place at atmospheric pressure and generally over a period of several hours. The degree of conversion of the SiH units is greater than 99% by number.

As regards the other functional groups E which have been described above and which can be carried by the silicons of the POS according to the invention, they can be grafted before, during or after the grafting of the alkylene radicals perfluorinated by Rf.

The following may be mentioned as examples of the POS which can be used as starting materials for the process according to the invention:

* linear POS such as polymethylhydrogenosiloxanes, especially those of the type:

$Me_3SiO(SiMeHO)_sSiMe_3$, where S=10 to 100, preferably 50;

or $Me_3SiO(SiMeHO)_{s1}(SiMe_2O)_{s2}SiMe_3$, where s1=10 to 100 and s2=0 to 50; and

* cyclic POS such as the tetramethyltetracyclosilosane D'4.

The following may be mentioned as examples of POS which are capable of being perhalogenated—preferably perfluorinated—by using the process according to the invention:

$Me_3SiO(SiMe_2O)\!-\!_8(SiHMeO)\!-\!_4SiMe_3$ $Me_3SiO(SiMeHO)\!-\!_{50}SiMe_3$

It has already been indicated above that the at least bifunctional POS (I) or (II) substituted by grafts Gf and E can take the form of oils. According to one presentation variant, said POS can be emulsified with water. Thus the present invention further relates to an aqueous dispersion which contains:

at least one POS as defined above or obtained by the process as defined above;

water; and at least one surfactant.

The oils of the invention can therefore be emulsified without the addition of an application solvent.

Furthermore, the performance characteristics in terms of oleophobicity and hydrophobicity can be improved by the addition of selected surfactants.

The fluorosilicones according to the invention can be associated with conventional fluoropolymers having an acrylate skeleton, the process for the synthesis of the latter naturally leading to an emulsion.

Other compounds of ionic character, such as salts of styrene/maleic anhydride copolymers, can be used in addition to the fluorinated POS of the invention.

In the cases where the fluorinated POS comprise salifiable specific groups E, this makes it possible to ensure emulsification through partial or complete salification with a base (COOH groups) or the quaternization of amine groups.

In other cases it is necessary to formulate an emulsion. A variety of solvents (alcohol, ketone, fluorinated solvents, ethyl acetate, etc.) are then used to dissolve the product first.

The surfactants used for emulsification are ionic or nonionic with a high hydrophilic/hydrophobic balance. They are generally selected from the following compounds:

ethoxylated fatty alcohols ethoxylated alkylphenols ethoxylated alkylamine salts ethoxylated polyalcohols alkylammonium salts, etc.

According to another of its features, the invention relates to the application of the perhalogenated (perfluorinated) silicon compounds per se, as described above, or those obtained by the perhalogenation process disclosed above, as:

lubricants, agents for lowering surface tension, dirt repellents, antiadhesives, antifoams, oleophobic and/or hydrophobic agents, raw materials for the production of elastomers for resisting chemical attack and solvents, and raw materials for the preparation of a film and/or coating possessing at least one of the above-mentioned properties.

As regards the particular properties of the perfluorinated (mono- but especially bis-perfluorinated) bifid grafts Gf, the present invention further relates to a dirt-repelling composition comprising:

at least one POS as defined above or obtained by the process as defined above, and/or at least one emulsion as defined above, said POS used preferably carrying:
* bifid grafts Gf bifunctionalized by perhalogenated—perfluorinated—radicals as defined in claim 5,
* other grafts E functionalized by groups other than bis- or mono-perhalogenated—perfluorinated—groups as defined above,
* and optionally bifid grafts Gf monofunctionalized by perhalogenated—perfluorinated—radicals also as defined above.

By way of illustration, it may be indicated that perfluorinated POS which can be applied as dirt repellents in textiles are, for example, those in which:
* E=

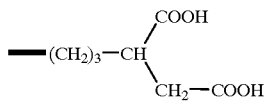

Perfluorinated POS which can be used as antiadhesives on paper or other substrates, including stone in particular (antigraffiti agents), are for example those in which:
* E=

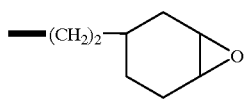

* or E=

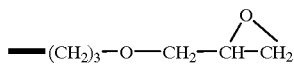

EXAMPLES

Example I

Synthesis of Silicone Oils Perfluorinated by Units Rf Comprising Two Types of Linkages Gf: $Gf_1$=Alkylene and $Gf_2$=Alkylcarboxyl, and also Containing Grafts E I.1. Synthesis This synthesis is carried out in 2 stages:

Stage 1—preparation of the POS oil grafted by perfluorinated units $Gf_1$ and by acid anhydride units E.

Stage 2—esterification of the anhydride groups in the oil of stage 1.

Stage 1

90.8 ml of dry toluene (dried over a molecular sieve) are introduced into a four-necked 250 ml reactor provided with a central mechanical stirrer, a thermometer, a vertical bulb condenser and a septum.

The medium is stirred, rendered inert with nitrogen and heated to a temperature of 90° C.

4.8 µl of a divinyltetramethyldisiloxane solution of a platinum complex containing 11% by weight of platinum with a divinyltetramethyldisiloxane ligand (KARSTEDT catalyst) are then introduced through the septum.

17.21 g (0.273 mol of Si—H groups) of a polymethylhydrogenosiloxane oil of the structure $(CH_3)_3SiO$—$(SiOCH_3H)_{50}$—$Si(CH_3)_3$, containing 1585 meq Si—H/100 g oil (RHODORSIL® H68 from RHONE POULENC), and 50.1 g (0.139 mol) of 3-perfluorohexylprop-1-ene are then run in gradually and simultaneously over a period of 90 minutes.

24 hours after the start of the reaction, with the degree of conversion of the SiH groups being only 44% (the maximum is 50%), a further 3.2 µl of the same KARSTEDT platinum solution are added.

2 h 30 min after this further addition, the degree of conversion of the Si—H groups is 49.5%. 25.13 g (0.179 mol) of allylsuccinic anhydride are then run in over a period of 90 minutes.

2×3.2 µl of the same KARSTEDT platinum solution are added separately (43 and 50 hours after the start of the first introduction).

72 hours after the start of the first introduction, the degree of conversion of the Si—H groups is 99%. A devolatilization is then carried out by heating up to 120° C. under vacuum (0.01 mbar) to remove the solvent and excess reactants. This gives 86.8 g of an oil of the structure

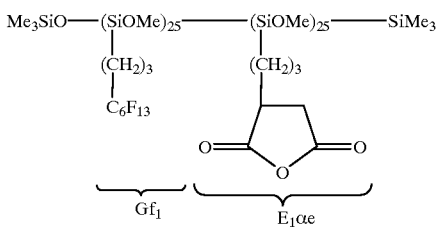

Stage 2

7.03 g of the oil described in stage 1), partially hydrolyzed and having the structure

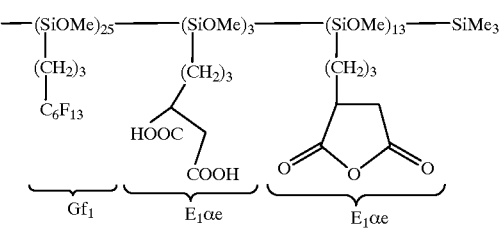

5.24 g (0.0113 mol) of 1-perfluorooctyl-2-hydroxyethane and 12.6 g of 1,1,2-trifluorotrichloroethane are introduced into a four-necked 50 ml reactor provided with a central mechanical stirrer, a thermometer, a vertical bulb condenser and a septum.

The medium is stirred and rendered inert with nitrogen, 0.15 g of pyridine is then introduced through the septum and the temperature of the medium is raised to 50° C.

After 8 hours a devolatilization is carried out by heating to 110° C. under vacuum to remove the solvent and excess unreacted alcohol. This gives 10.35 g of an oil of the structure

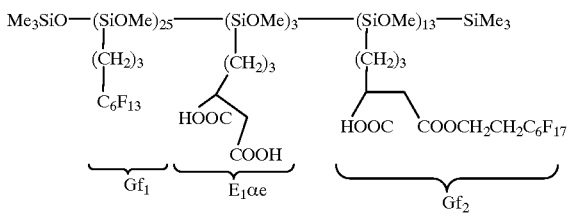

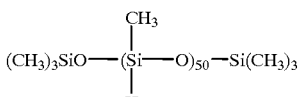

The infrared spectrum of this oil shows that the anhydride groups have totally disappeared (no more bands at 1780 and 1860 cm$^{-1}$). NMR analyses confirm the structure of this functionalized silicone oil.

I.2. Application of the bifunctional POS oil obtained in I.1
* Grease resistance test:

The grease resistance of the oil of Example I.1 is evaluated on a polyamide-6 (PA 6) mat treated with this oil by AATCC (American Association of Textile Chemists and Colorists) test no. 118-1983, which consists in depositing drops of standard liquids (at most eight) of decreasing polarity on the treated mat and measuring the time for which the drop remains on the surface before penetrating the mat (denoted by t hereafter). Each liquid has a corresponding number and the perfluorinated oil is assigned a grade corresponding to the liquid of highest number which remains on the surface of the mat for at least 30 seconds.

* Treatment of the mat:

The oil KP 307 is deposited in different amounts on a polyamide-6 mat from a solution in 1,1,2-trifluorotrichloroethane; the mat is first placed in an oven for 14 hours at 30° C. and then placed in an oven for 6 minutes at 80° C. and 4 minutes at 140° C.

* Results:

TABLE 1

| Amount of fluorine/ PA 6 (ppm) | t with liquid no. 1 (seconds) | t with liquid no. 2 (seconds) | t with liquid no. 3 (seconds) | t with liquid no. 4 (seconds) | t with liquid no. 5 (seconds) |
|---|---|---|---|---|---|
| 70 | >50 | >50 | 1 | 1 | 1 |
| 1400 | >50 | >50 | 39 | 1 | 1 |
| 2800 | >50 | >50 | >50 | 36 | 1 |
| 4200 | >50 | >50 | >50 | 17 | 2 |
| 5600 | >50 | >50 | >50 | >50 | 7 |
| 7000 | >50 | >50 | >50 | >50 | 7 |

The compositions of the standard grading liquids used are as follows:
liquid 1: NUJOL (liquid paraffin)
liquid 2: NUJOL/n-hexadecane, 65/35 by volume, at 21° C.
liquid 3: n-hexadecane
liquid 4: n-tetradecane
liquid 5: n-dodecane Thus the oil of I.1 has corresponding grades of 2 at 700 ppm of fluorine, 3 at 1400 and 4200 ppm of fluorine and 4 at 2800, 5600 and 7000 ppm of fluorine.

Example II
Synthesis of a Bifunctional Perfluorinated Silicone Oil Containing $Gf_1$ and $E_1\gamma e$ 262.5 g of a mixture of perfluorohexylisopent-1-ene and -2-ene ($C_6F_{13}CH_2CH_2C(CH_3)=CH_2$ and $C_6F_{13}CH_2CH=C(CH_3)_2$) in proportions of 20 and 80% respectively, i.e. 0.135 and 0.541 mol respectively, and 7.75 g of a polymethylhydrogenosiloxane (i.e. 0.122 mol of Si—H groups) having the following characteristics:

* $Mn=3160$ g,
* 1.585 eq of Si—H per 100 g,
* average structure:

$$(CH_3)_3SiO\text{---}(\underset{H}{\underset{|}{\overset{CH_3}{\overset{|}{Si}}}}\text{---}O)_{50}\text{---}Si(CH_3)_3$$

are introduced into a four-necked 1000 ml reactor provided with a central mechanical stirrer, a thermometer, a vertical bulb condenser and a septum.

The medium is stirred, rendered inert with nitrogen and heated to a temperature of 100° C. 13 µl (i.e. 100 ppm/total weight of Si—H oil) of a divinyltetramethyldisiloxane solution of a platinum complex containing 11.9% by weight of platinum with a divinyltetramethyldisiloxane ligand (Karstedt catalyst) are then introduced through the septum; after 30 minutes, when the degree of conversion of the Si—H introduced is 79%, 262.5 g of a mixture of perfluorohexylisopent-1-ene and -2-ene ($C_6F_{13}CH_2CH_2C(CH_3)=CH_2$ and $C_6F_{13}CH_2CH=C(CH_3)_2$) in proportions of 20 and 80% respectively, i.e. 0.135 and 0.541 mol respectively, and 7.75 g of the same polymethylhydrogenosiloxane (i.e. 0.122 mol of Si—H groups) are run in simultaneously over 80 minutes. 3 h 15 minutes after the start of the reaction, when the degree of conversion of all the Si—H introduced is 76%, 13 µl of Karstedt catalyst are introduced. 22 h after the start of the reaction, when the degree of conversion of all the Si—H introduced is 88.6%, 7 g (i.e. 0.056 mol or 2 eq/residual Si—H) of vinylcyclohexene and 6.5 µl of Karstedt catalyst are introduced through the septum. 12 h after these last additions, the degree of conversion of the Si—H groups is 99.9%. A devolatilization under vacuum (110° C. under 1 mm Hg for 2 h) is carried out to remove the perfluorohexylisopent-2-ene and the excess perfluorohexylisopent-1-ene and vinylcyclohexene. This gives 90 g of an oil of the structure

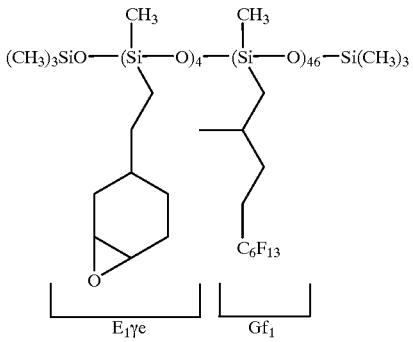

Example III
Synthesis of Another Bifunctional Perfluorinated Silicone Oil Containing $Gf_1$ and $E_1\gamma e$ 17.3 g (i.e. 0.0462 mol) of perfluorohexylbutene, $C_6F_{13}CH_2CH_2CH=CH_2$, and 5.7 g (i.e. 0.0462 mol) of vinylcyclohexene are introduced into a four-necked 100 ml reactor provided with a central mechanical stirrer, a thermometer, a vertical bulb condenser and a septum.

The medium is stirred, rendered inert with nitrogen and heated to a temperature of 100° C. 17 µl (i.e. 50 ppm/weight of Si—H oil) of a divinyltetramethyldisiloxane solution of a platinum complex containing 11.9% by weight of platinum with a divinyltetramethyldisiloxane ligand (Karstedt catalyst) are then introduced through the septum.

40 g (i.e. 0.084 eq of Si—H) of a poly(dimethyl, methylhydrogenosiloxane) oil are then introduced over a period of 80 minutes, the characteristics of said oil being as follows:
* Mn=3750 g,
* 0.21 eq of Si—H per 100 g of oil,
* average structure:

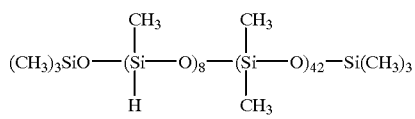

When the introduction has ended, the degree of conversion of the Si—H groups is 98.6% and increases to 99.9% after 40 minutes. A devolatilization under vacuum (100° C. under 1 mm Hg for 1 h 30 min) is carried out to remove the excess of both reactants. This gives 59.1 g of an oil of the structure

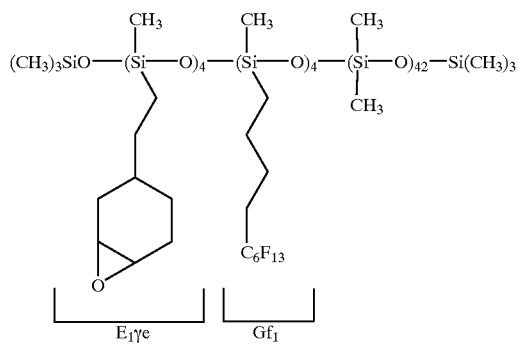

containing 0.065 eq of epoxy per 100 g of oil (perchloric acid assay).

Example IV
Synthesis of a Bifunctional Perfluorinated Silicone Oil Containing $Gf_1$ and $E_1\alpha e$ 7.36 g (i.e. 0.0165 mol) of perfluorooctylethylene, $C_8F_{17}CH=CH_2$, and 30 g (i.e. 0.033 eq of Si—H) of a poly(dimethyl,methylhydrogenosiloxane) oil having the following characteristics:
* Mn=3806 g,
* 0.11 eq of Si—H per 100 g of oil,
* average structure:

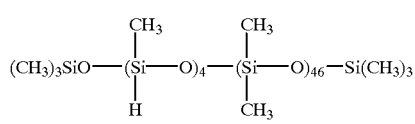

are introduced into a three-necked 50 ml reactor provided with a central mechanical stirrer, a thermometer and a vertical bulb condenser.

The medium is stirred, rendered inert with nitrogen and left to stand at room temperature. 0.075 g of dicobalt octacarbonyl stabilized with hexane (i.e. 0.25 wt. %/Si—H oil) is then introduced.

The exothermicity of the reaction raises the temperature by 10° C. over a short period. 10 hours after the start of the reaction, the degree of conversion of the Si—H groups has reached 48.5%.

The medium is then transferred to a separating funnel and washed with 3×30 ml of methanol. The methanol still contained in the silicone phase is removed by devolatilization under vacuum at 80° C. for 2 h.

25.23 g (i.e. 0.01 eq of Si—H) of the partially grafted oil, containing 0.037 eq of Si—H per 100 g, and 1.54 g (i.e. 0.011 mol) of allylsuccinic anhydride are then introduced into a 50 ml round-bottomed flask provided with a central mechanical stirrer, a thermometer and a vertical bulb condenser.

The medium is stirred, rendered inert with nitrogen and heated to a temperature of 100° C. 10.6 µl (i.e. 50 ppm/weight of Si—H oil) of a divinyltetramethyldisiloxane solution of a platinum complex containing 11.9% by weight of platinum with a divinyltetramethyldisiloxane ligand (Karstedt catalyst) are then introduced through the septum. 10 hours after the addition of platinum, the degree of conversion of the Si—H groups is 71.5%; 10.6 µl of Karstedt catalyst are then added. After 24 hours, the degree of conversion of the Si—H groups is 97%; a devolatilization under vacuum is then carried out to remove the excess allylsuccinic anhydride. This gives 26.51 g of an oil of the structure

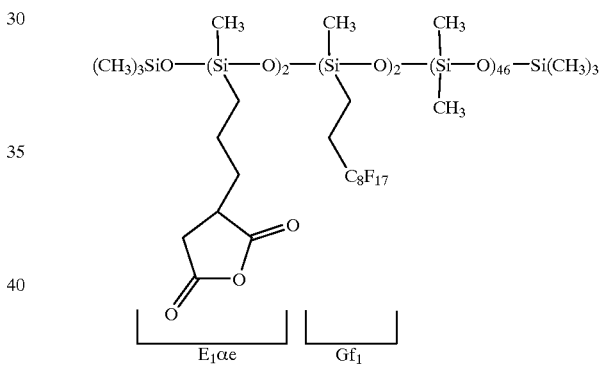

Example V
Synthesis of a Bifunctional Perfluorinated Silicone Oil Containing $Gf_1$ and $E_6$ 10 g of toluene are introduced into a four-necked 100 ml reactor provided with a central mechanical stirrer, a thermometer, a vertical bulb condenser and a septum.

The medium is stirred, rendered inert with nitrogen and heated to a temperature of 85° C. 2 µl (i.e. 40 ppm/weight of Si—H oil) of a divinyltetramethyldisiloxane solution of a platinum complex containing 11.9% by weight of platinum with a divinyltetramethyldisiloxane ligand (Karstedt catalyst) are introduced.

On the one hand 20 g (i.e. 0.0435 mol) of perfluorooctylpropylene, $C_8F_{17}CH_2CH=CH_2$ and on the other hand 5.18 g (i.e. 0.081 mol of Si—H groups) of a polymethylhydrogenosiloxane having the following characteristics:
* Mn=3160 g,
* 1.585 eq of Si—H per 100 g,

* average structure:

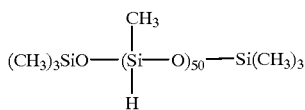

are then introduced simultaneously through the septum over a period of 1 h. After 2 h 40 minutes, when the degree of conversion of the Si—H groups is 54%, 8.27 g (i.e. 0.0405 mol) of 1-allyl-3-methyl-5-t-butylphenol are introduced over a period of 30 minutes. After 11 h, the degree of conversion of the Si—H groups is total and a devolatilization under vacuum (2 h at 70° C. under 1 mbar) is carried out to remove the toluene and excess perfluorooctylpropylene. This gives 31.71 g of an oil of the structure

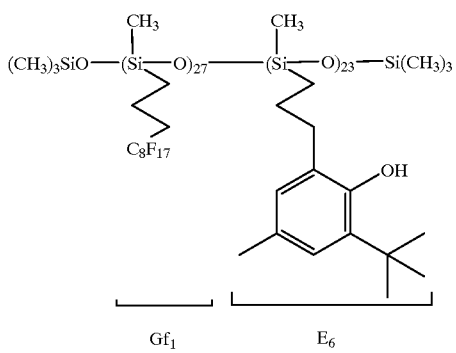

Example VI
Synthesis of a Bifunctional Perfluorinated Silicone Oil Containing $Gf_1$ and $E_{13}$ 30 g of toluene are introduced into a three-necked 100 ml reactor provided with a central mechanical stirrer, a thermometer and a vertical bulb condenser.

The medium is stirred, rendered inert with nitrogen and heated to a temperature of 90° C. and 2.1 μl (i.e. 20 ppm/weight of Si—H oil) of a divinyltetramethyldisiloxane solution of a platinum complex containing 9.5% by weight of platinum with a divinyltetramethyldisiloxane ligand (Karstedt catalyst) are then introduced.

On the one hand 28.4 g (i.e. 0.0789 mol) of perfluorooctylpropylene, and on the other hand 9.74 g (i.e. 0.154 mol of Si—H groups) of a polymethylhydrogenosiloxane having the following characteristics:
* Mn=3160 g,
* 1.585 eq of Si—H per 100 g,
* average structure:

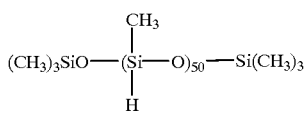

are then run in simultaneously over a period of 1 h 30 minutes. 4 h 40 minutes after the start of the reaction, the degree of conversion of the Si—H groups is 32%; a further 2 μl of Karstedt catalyst are then added. 1 h 50 minutes after this further addition, with the degree of conversion of the Si—H groups being 48.7%, 10.2 g (i.e. 0.1 mol) of allyloxyethanol are run in over 25 minutes. 1 h after the end of this 2nd introduction, the degree of conversion of the Si—H is 87.7%; 4 μl of Karstedt catalyst are then added. After 14 h, with the degree of conversion of the Si—H being 96.5%, a devolatilization under vacuum (75° C. for 1 h under 5 mm Hg) is carried out to remove the toluene. This gives 34.3 g of an oil of the structure

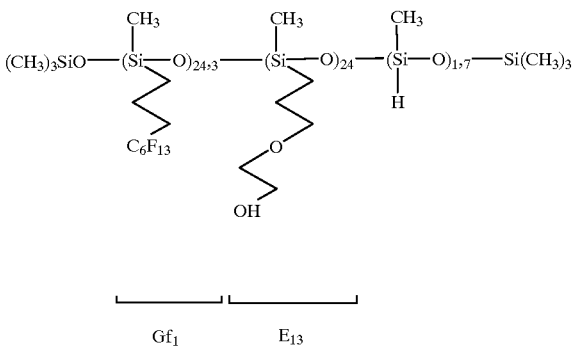

Example VII
Synthesis of a Trifunctional Grafted Silicone Oil Containing $Gf_1$, $E_1\gamma e$ and $E_3$ 12.3 g (i.e. 0.0275 mol) of perfluorooctylethylene, $C_8F_{17}CH=CH_2$, and 50 g (i.e. 0.055 eq of Si—H) of a poly(dimethyl,methylhydrogenosiloxane) oil having the following characteristics:
* Mn=3806 g,
* 0.11 eq of Si—H per 100 g of oil,
* average structure:

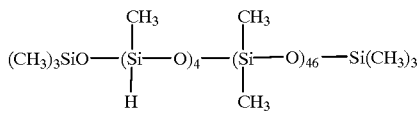

are introduced into a three-necked 100 ml reactor provided with a central mechanical stirrer, a thermometer and a vertical bulb condenser.

The medium is stirred, rendered inert with nitrogen and heated to 50° C. 0.049 g of dicobalt octacarbonyl stabilized with hexane (i.e. 0.1 wt. %/Si—H oil) is then introduced. 10 h 30 minutes after the start of the reaction, the degree of conversion of the Si—H groups has reached 34%; a further 0.049 g of dicobalt octacarbonyl stabilized with hexane is then added. After 1 h, the degree of conversion of the Si—H has reached 48.5%. The medium is then transferred to a separating funnel and washed with 3×50 ml of methanol. The residual oil, partially emulsified by methanol, is solubilized in 1,1,1-trifluorotrichloroethane and the mixture is devolatilized at 90° C. under atmospheric pressure.

53.3 g (i.e. 0.017 eq of Si—H) of the partially grafted oil, containing 0.032 eq of Si—H/100 g, 5 μl of a divinyltetramethyldisiloxane solution of a platinum complex containing 10.0% by weight of platinum with a divinyltetramethyldisiloxane ligand (Karstedt catalyst) and 6 g (i.e. 0.0484 mol) of vinylcyclohexene are then introduced into a three-necked 50 ml round-bottomed flask provided with a central mechanical stirrer, a thermometer and a vertical bulb condenser.

The temperature of the medium is raised to 70° C. and, after 1 h 30 minutes, the degree of conversion of the Si—H groups is total. A devolatilization under vacuum (135° C. for 2 h under 6 mbar) is then carried out to remove the excess perfluorooctylethylene and vinylcyclohexene. This gives 49.67 g of an oil of the structure

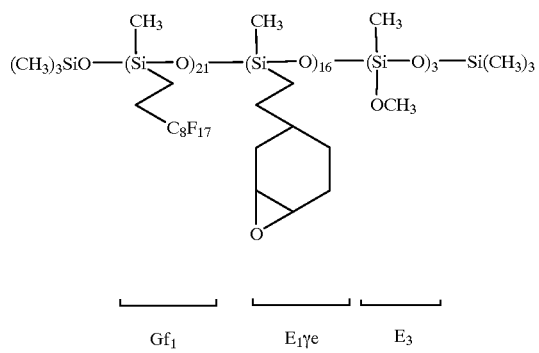

containing 0.0359 eq of epoxy per 100 g of oil (perchloric acid assay).

Example VIII

Synthesis of Another Trifunctional Silicone Oil Containing $Gf_1$, $E_1\gamma e$ and $E_3$ 271.6 g (i.e. 0.609 mol) of perfluorooctylethylene, $C_8F_{17}CH=CH_2$, and 400 g (i.e. 1.16 eq of Si—H) of a poly(dimethyl,methylhydrogenosiloxane) oil having the following characteristics:
* Mn=6200 g,
* 0.29 eq of Si—H per 100 g of oil,
* average structure:

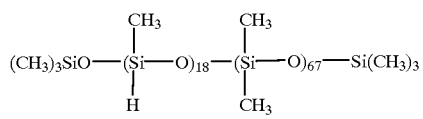

are introduced into a four-necked 1000 ml reactor provided with a central mechanical stirrer, a thermometer, a vertical bulb condenser and a dropping funnel.

The medium is stirred, rendered inert with nitrogen and heated to 50° C. 0.7944 g of dicobalt octacarbonyl stabilized with hexane (i.e. 0.2 wt. %/Si—H oil) is then introduced.

8 h 15 minutes after the start of the reaction, the degree of conversion of the Si—H groups has reached 30.4%; a further 0.3972 g of dicobalt octacarbonyl stabilized with hexane (i.e. a total of 0.3 wt. %/Si—H oil) is then added. After 1 h, the degree of conversion of the Si—H has reached 49.7%. The medium is then transferred to a separating funnel and washed with 4×175 g of methanol. The residual oil, partially emulsified by methanol, is devolatilized at 90° C. under 6 mm Hg for 45 minutes.

597.1 g (i.e. 0.211 eq of Si—H) of the partially grafted oil, containing 0.0353 eq of Si—H/100 g, 30 µl of a divinyltetramethyldisiloxane solution of a platinum complex containing 9.5% by weight of platinum with a divinyltetramethyldisiloxane ligand (Karstedt catalyst) and 30.4 g (i.e. 0.245 mol) of vinylcyclohexene are then introduced into a four-necked 1000 ml round-bottomed flask provided with a central mechanical stirrer, a thermometer and a vertical bulb condenser.

The temperature of the medium is raised to 80° C. and, after 1 h, the degree of conversion of the Si—H groups is 94.4%. A further 30 µl of Karstedt catalyst are then added. After 8 h, the degree of conversion of the Si—H groups is total. A volatilization under vacuum (135° C. for 2 h under 6 mbar) is then carried out to remove the excess perfluorooctylethylene and vinylcyclohexene. This gives 591.6 g of an oil of the structure

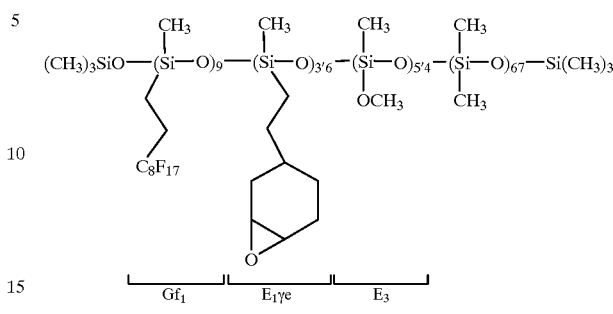

containing 0.0213 eq of epoxy per 100 g of oil (perchloric acid assay).

Example IX

Synthesis of Mono- and Bis-Perfluoroalkyl Alkyl Monomeric Pos=Precursors $Gf_p$ of Bifid Grafts Gf and E Reaction:

(BRD 1776)

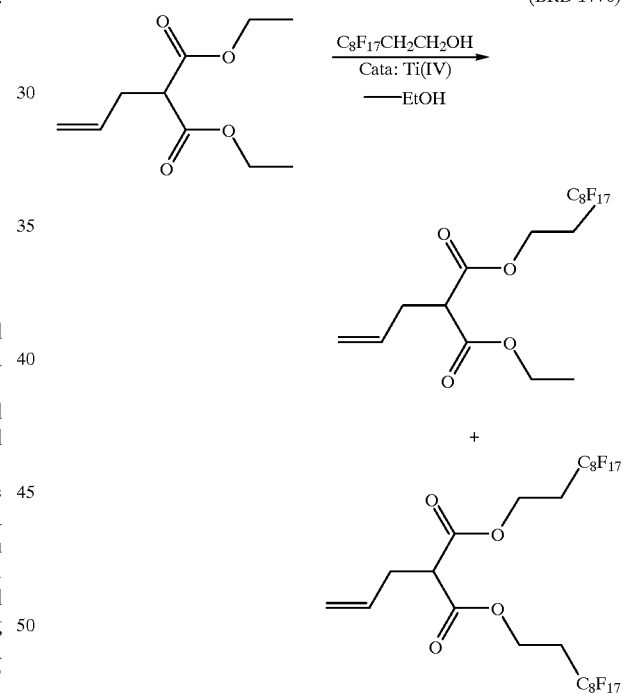

2018 g (10.09 mol) of diethyl allylmalonate, 2340 g (5.04 mol) of the alcohol $C_8F_{17}CH_2CH_2OH$, 3.8 g (0.016 mol) of $Ti(OEt)_4$ and 1000 g of dry toluene are introduced into a 5 l reactor under nitrogen. The temperature in the reaction mixture is raised to 95° C. and the reaction takes place under partial vacuum (≈500 mm Hg) to favor elimination of the ethanol. After 5 h of reaction, a further 7.3 g (0.032 mol) of $Ti(OEt)_4$ are added. The reaction is left to proceed for 120 h. Analysis by gas chromatography indicates that the degree of conversion of the perfluorinated alcohol is 100%. 60 g of neutral alumina (50–200 µm) are added and the mixture is filtered on board. The light materials are devolatilized under a pump vacuum (5 mm Hg, 3 h 40 min).

A vacuum distillation is then carried out to separate the two mono- and bis-perfluoroalkyl monomers.

| Compound | Results/Purity/Characteristics |
|---|---|
| 1) (allyl diester with O(CH$_2$)C$_8$F$_{17}$ and OC$_2$H$_6$) | 716 g<br>>97.5%<br>95° C./0.05 mm Hg |
| 2) (allyl diester with two O(CH$_2$)C$_8$F$_{17}$ groups) | 760 g<br>>97%<br>White solid m.p. = 38° C. |

IR and NMR analyses confirm the structure of these two monomers.

Example X

Synthesis of Pos Substituted by Bisperfluorinated Bifid Grafts Gf$_{62}$ and by Groups E$_1$βe=Prelinkage Gf 217.3 g of dry toluene are introduced into a 1000 ml reactor under nitrogen and heated to 98° C. 2.2 μl of KARSTEDT catalyst (11.5% by weight of Pt) are then added. 24.6 g of a silicone oil containing Si—H units, of the structure Me$_3$SiO(SiMe$_2$O),(SiMeHO),$_{70}$SiMe$_3$ (Si—H content: 11.27 mol of Si—H/kg, i.e. 0.277 mol of Si—H), and 230.2 g (0.222 mol) of the bisperfluoroalkyl monomer described in Example no. 1, in the molten state (≈70° C.), are run in simultaneously over 2 h 15 min. The reaction is left to proceed at 98° C. for 21 h 40 min. The degree of conversion of the Si—H units is 79.3%. 50.6 g (0.361 mol) of allylsuccinic anhydride and 2.2 μl of KARSTEDT catalyst are then added. The reaction is left to proceed at 98° C. for 50 h. The degree of conversion of the Si—H units is virtually complete. The reaction mixture is heterogeneous. On standing at 25° C. it separates out cleanly into two phases. The product phase is filtered on a BÜCHNER funnel and washed with toluene to give a white solid. Water (≈100 ml) is added and the reaction is left to proceed for 17 h at 25° C. Toluene is added to remove the free monomers. After decantation, the toluene phase is withdrawn and the solid is then filtered off and dried under vacuum at 25° C. under 5 mm Hg. 465 g of a white solid are recovered. IR and NMR analyses confirm the structure of this silicone oil. The melting point is about 65° C. and elemental analysis gives a fluorine content of 53.8%.

(PHO 127)

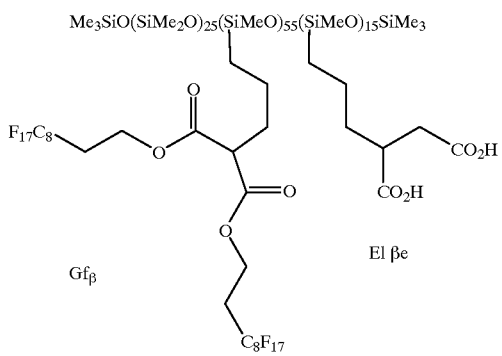

Example XI

Synthesis of Pos Substituted by Monoperfluorinated Bifid Grafts Gf and by Groups E$_1$βe =Prelinkage Gf 145.2 g of dry toluene are introduced into a 1000 ml reactor under nitrogen and the medium is heated to 94° C. 5 μl of KARSTEDT catalyst (11.5% of Pt) are added. A mixture consisting of 578.5 g (0.936 mol) of the monoperfluorinated monomer described in Example VIII and 105.6 g of a silicone oil containing Si—H units, of the structure Me$_3$SiO(SiMe$_2$O)$_{25}$(SiMeHO)$_{70}$SiMe$_3$ (Si—H content: 11.27 mol of Si—H/kg, i.e. 1.19 mol of Si—H), is then run in over 2 h. The reaction is left to proceed at 94° C. for 28 h 30 min. The degree of conversion is 53%. A further 5 μl of KARSTEDT catalyst (11.5% of Pt) are then added and the reaction is left to proceed for a total of 69 h 30 min. The degree of conversion of the Si—H units is 73%. 96.2 g (0.925 mol) of allylsuccinic anhydride are then introduced. The reaction is left to proceed for 128 h. The degree of conversion of the Si—H units is 96.5%. About 100 ml of water are added and the mixture is stirred for 15 h at 25° C. and left to decant. The organic phase is devolatilized (5 h at 120° C. under 2 mbar) and 1330 g of a viscous oil are recovered. IR and NMR analyses confirm the structure of this silicone oil and elemental analysis gives a fluorine content of 41%

(PHO 128)

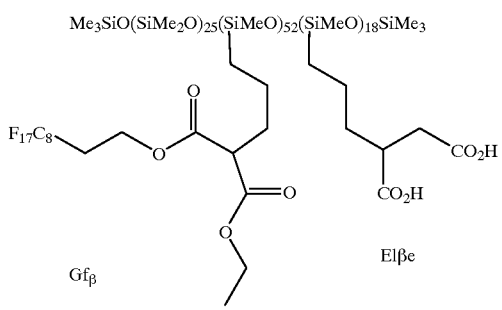

Example XII

Synthesis of Pos Substituted by Monoperfluorinated Bifid Grafts Gf and by Groups E$_1$βe=Prelinkage Gf 775 g of dry toluene and 0.2944 g of PtCl$_2$(PhCN)$_2$ in CH$_2$Cl$_2$ (catalyst solution: 0.0169 g of catalyst in 1.8429 g of CH$_2$Cl$_2$) are introduced into a 1000 ml reactor under nitrogen. The mixture is heated to 80° C. and a solution of 134.9 g (1.5209 eq of Si—H units) of a silicone oil of the structure Me₃SiO(SiMe₂O)₂₅(SiMeHO)₇₅SiMe₃ is run in over 2 h. The reaction is left to proceed at 80° C. for 24 h, a further two 0.15 g portions of the Pt catalyst solution being added. The degree of conversion of the Si—H units is 69.79%. 106 g of allylsuccinic anhydride and 59 µl of a KARSTEDT catalyst solution (Pt content: 11.5%) are then added at 80° C. The reaction is left to proceed for 24 h. The degree of conversion is 96%. The reaction mixture is devolatilized (120° C., 5 mm Hg). The oil obtained is washed 6 times with 250 ml of water. Devolatilization is repeated to give 852.5 g of a viscous oil. IR and NMR analyses confirm the structure of this silicone oil.

(BRD 1778)

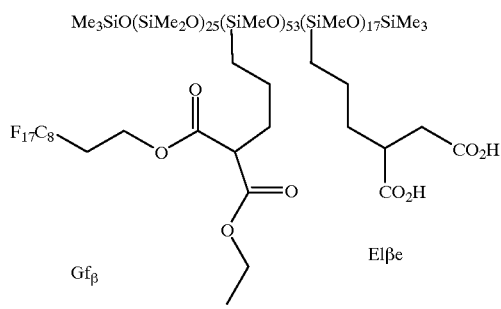

Example XIII

Synthesis of Pos Substituted by Bisperfluorinated Bifid Grafts Gf$_\beta$ and by Groups E$_1$βe=Prelinkage Gf 50 g of toluene and 12.5 mg of Pt in the form of a KARSTEDT catalyst are introduced into a 5 l reactor under nitrogen. The reaction mixture is heated to 85° C. and a mixture consisting of 400 g of dry toluene, 874.94 g (0.864 mol) of the bisperfluoroalkyl monomer described in Example no. 1 and 625.06 g of a silicone oil containing Si—H units, of the structure Me₃SiO(SiMe₂O)₂₀₀(SiNeHO)₄₅SiMe₃ (1.55 mol of Si—H units), is run in over 3 h. The reaction is left to proceed for 4 h at this temperature. The degree of conversion of the Si—H units is 55%. 1901 g of a clear oil are recovered.

95.6 g (0.682 mol) of allylsuccinic anhydride and 0.1653 g of a KARSTEDT catalyst solution (11.5% of Pt) are introduced into a 2000 ml reactor. The reaction mixture is heated to 105° C. and 950.6 g of the previous silicone oil containing Si—H units (3.412 mol of Si—H units) are run in. The reaction is left to proceed at this temperature for 4 h. The degree of conversion of the Si—H units is 96.3%. 500 ml of water are then added. The reaction is left to proceed for 7 h under reflux. The mixture is cooled and devolatilized under 3 mm Hg at 110° C. for 4 h. 781.6 g of a viscous oil are recovered. IR and NMR analyses confirm the structure of this silicone oil.

(BRD 1784)

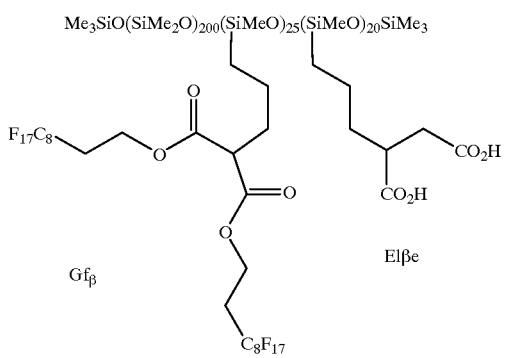

Example XIV

Synthesis of POS Substituted by Bisperflorinated Bifid Grafts Gf$_\beta$ and by Groups E$_2$ (hals)=Prelinkage Gf 93.01 g (0.442 mol) of allyloxy-HALS and 0.1651 g of a KARSTEDT catalyst solution (11.5% of Pt) are introduced into a 2000 ml reactor under nitrogen. The mixture is heated to 95–98° C. 949.6 g of the silicone oil containing Si—H units of Example 6, functionalized to the extent of 55% by the monomer containing bisperfluoroalkyl units described in Example no. 1, are then run in over 2 h. The reaction is left to proceed for 2 h at 100° C. The degree of conversion of the Si—H units is complete. The mixture is left to cool and 50 ml of toluene are added. The medium is devolatilized for 5 h at 110–140° C. under 2–5 mm Hg. 755.5 g of a very viscous liquid are recovered. IR and NMR analyses confirm the structure of this silicone oil.

(BRD 1785)

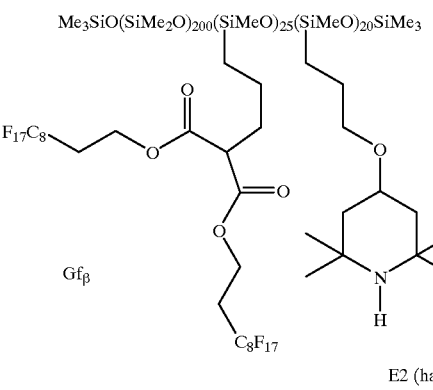

Example XV

Synthesis of POS Substituted by Bisperfluorinated Bifid Grafts Gf$_\beta$ and by Groups E$_2$ (hals)=Prelinkage Gf 5 g of dry toluene and 1.2 mg of Pt in the form of a KARSTEDT catalyst (11.45% of Pt) are introduced into a 250 ml reactor under nitrogen. The reaction mixture is heated to 95° C. and a mixture consisting of 20.24 g (0.02 mol) of the monomer containing bisperfluoroalkyl units described in Example no. 1 and 69.15 g of a silicone oil containing Si—H units, of the structure Me₃SiO(SiMe₂O)₂₂₀(SiMeHO)₂₅SiMe₃(0.1 mol of Si—H units), is run in over 1 h. A further 25 g of toluene are added and the reaction is left to proceed at this temperature for 1 h 10 min. The degree of conversion of the Si—H units is 25.8%.

18.99 g (0.0963 mol) of allyloxy-HALS and 20.76 mg of a KARSTEDT catalyst solution (11.5% of Pt) are introduced into a 2000 ml reactor under nitrogen. The mixture is heated to 98° C. 119.39 g (0.0715 mol of Si—H) of the silicone oil containing Si—H units, functionalized to the extent of 25.8% by the monomer containing bisperfluoroalkyl units described in Example no. 1, are then run in over 1 h. The reaction is left to proceed for 1 h at 100° C. The degree of conversion of the Si—H is complete. The mixture is left to cool. It is devolatilized for 6 h at 140° C. under 3 mm Hg. 86.1 g of a very viscous liquid are recovered. IR and NMR analyses confirm the structure of this silicone oil.

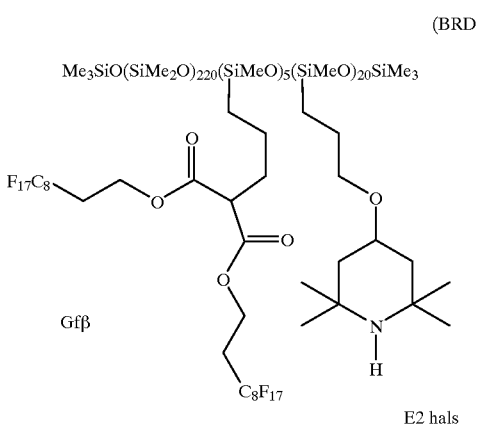

(BRD 1788)

E2 hals

Example XVI
Synthesis of POS Substituted by Bisperfluorinated Bifid Grafts Gf$_\beta$ and by Groups E$_3$ (hals)=Prelinkage Gf 120 g of monomer 2 containing bisperfluoroalkyl units described in Example IX and 3.5 µl of a KARSTEDT catalyst solution (11.5% of Pt) are introduced into a 250 ml reactor under nitrogen. The reaction mixture is heated to 90° C. A silicone oil containing Si—H units, of the structure Me$_3$SiO(SiMeHO)$_{15}$(SiMeOEtO)$_{35}$SiMe$_3$ (0.105 mol of Si—H units), are then introduced over 1 h 30 min. The reaction is left to proceed for 46 h at 90° C. The degree of conversion of the Si—H units is 96.4%. The medium is devolatilized for 2 h at 200° C. under 3 mm Hg. 127.6 g of a viscous clear oil are recovered. IR and NMR analyses confirm the structure of this silicone oil.

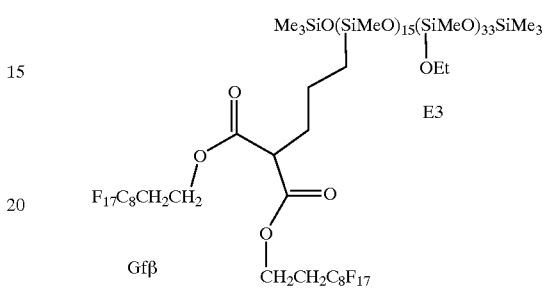

(PHO 118)

Example XVII
Determination of the Degree of Crystallinity

Table 1 below collates the degree of crystallinity measured by X-rays on some monomers and functionalized silicones.

These results show the organization resulting from the particular structure of monomer 2 containing bisperfluoroalkyl units described in Example IX.

Differential thermal analysis performed on the same products also shows a crystallization peak.

TABLE 1

| Structure | Degree of crystallinity/ Crystallization temperature |
|---|---|
| 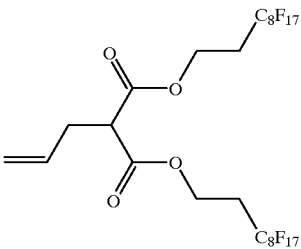<br>(BRD 1776) | 68.9% (on sample as such at room temperature)<br>36° C. (maximum of the crystallization peak) |
| 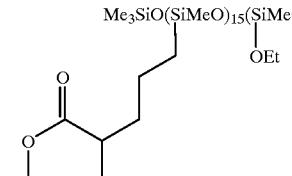<br>(PHO 118) | 41.4% (on sample as such at room temperature)<br>44° C. (maximum of the crystallization peak) |

TABLE 1-continued

| Structure | Degree of crystallinity/ Crystallization temperature |
|---|---|
| 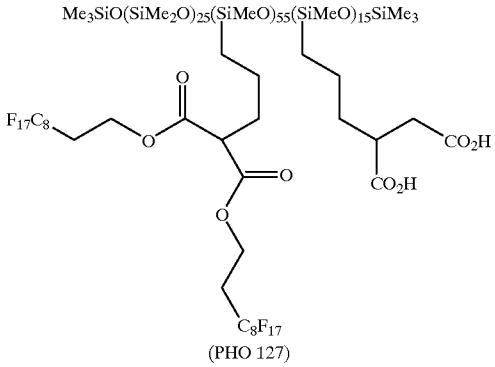 Me₃SiO(SiMe₂O)₂₅(SiMeO)₅₅(SiMeO)₁₅SiMe₃ ... (PHO 127) | 41.4% (on sample as such at room temperature) 53% (after remelting and recrystallization) 59° C. (maximum of the crystallization peak) |
| 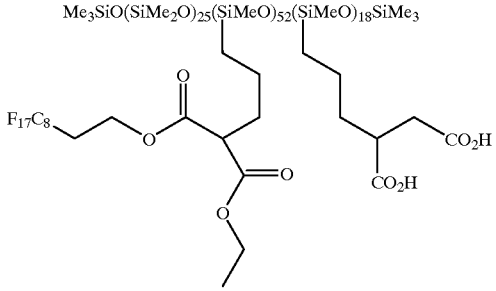 Me₃SiO(SiMe₂O)₂₅(SiMeO)₅₂(SiMeO)₁₈SiMe₃ ... (PHO 128) | amorphous product |

Example XVIII

Synthesis, Emulsification and Application of POS Containing Monoperfluorinated Bifid Grafts Gf and Grafts $E_\beta e$ XVIII.1. The oils of the following structures were synthesized by following the operating protocol used in Examples IX, X, XI and XII above.

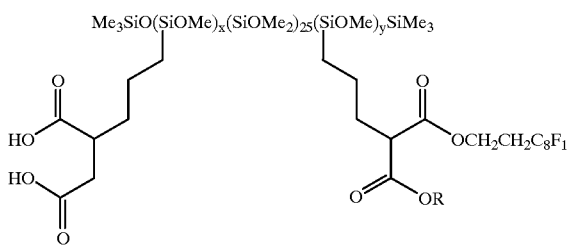

TABLE 2

| Sample | x | y | R |
|---|---|---|---|
| PHO 105 | 15 | 55 | C₂H₅ |
| PHO 107 | 55 | 15 | C₂H₅ |
| PHO 127 | 15 | 55 | CH₂CH₂C₈F₁₇ |
| PHO 128 | 15 | 55 | C₂H₅ |

XVIII.2. Emulsification

PHO 105

The following ingredients are mixed:

| PHO 105: | 6 g |
|---|---|
| AD33: | 0.5 g |
| GENAPOL X080: ethoxylated C₁₃ fatty alohcol | 0.1 g |

Water is added gradually and the ingredients are mixed by hand. A further 7 g of $H_2O$ are then added and the ingredients are emulsified using a SILVERSTON mixer.

A white emulsion (dry extract=46.3%, mean particle size=7965 μm) is obtained.

PHO 107

The following ingredients are mixed:

| PHO 100: | 2.5 g |
|---|---|
| AD33: | 0.5 g |
| Butyl digol: | 1.25 g |
| BRIJ 72: | 0.5 g |

Water is added gradually and the ingredients are mixed by hand. A further 10 g of $H_2O$ are then added and the ingredients are emulsified using a SILVERSTON mixer.

A light brown emulsion (dry extract=31%) is obtained.

XVIII.3. The following commercial perfluorinated polyacrylates are tested in addition to the fluorinated POS according to the invention: FC 396 from 3M and AG 850 from ASAHI. The characteristics of the products tested are given in Table 3 below:

TABLE 3

Global characteristics of the synthesized oils and commercial products

| | x | y | R | Mn (calculated) | % fluorine |
|---|---|---|---|---|---|
| PHO 100 | 0 | 70 | $C_2H_5$ | 49500 | 45.7* |
| PHO 105 | 15 | 55 | $C_2H_5$ | 42500 | 41.7* |
| PHO 107 | 55 | 15 | $C_2H_5$ | 24200 | 20.0* |
| PHO 127 | 15 | 55 | $CH_2CH_2C_8F_{17}$ | 65600 | 54.1*/53.8** |
| PHO 128 | 15 | 55 | $C_2H_5$ | 42500 | 41.7*/41.1** |
| FC 396 | poly-acrylate | perfluorinated | $C_8F_{17}$ chain | | 17** |
| AG 850 | poly-acrylate | perfluorinated | $C_8F_{17}$ chain | | 13** |

*calculated
**determined

XVIII.4. Application

Two series of tests are performed:

application in a solvent

Deposition of 700 ppm of fluorine (impregnation of a 15 g disk of polyamide (PA) mat) from solutions diluted to 1% in trichlorotrifluoroethane. The fluorinated POS used are PHO 105, 107, 127 and 128. FC 396 and AG 850 are also employed in solution.

Drying for 6 minutes at 80° C., followed by heat treatment for 4 minutes at 140° C.

application in an emulsion

Deposition of 700 ppm of fluorine (application with a gun to a 15 g disk of PA mat) from the emulsions described above: PHO 105 and PHO 107. FC 396 and AG 850 are also tested in emulsion.

Drying for 6 minutes at 80° C., followed by heat treatment for 4 minutes at 140° C.

The hydrophobicity and oleophobicity properties are evaluated by the penetration or non-penetration of liquids of decreasing surface tension (on three drops of liquid).

The POS is assigned the number corresponding to the liquid of lowest surface tension which does not penetrate after 30 seconds in the oleophobicity test and after 3 minutes in the hydrophobicity test.

TABLE 4

| Hydrophobicity index | Composition: IPA/$H_2O$ |
|---|---|
| 0 | 0/100 |
| 1 | 10/90 |
| 2 | 20/80 |
| 3 | 30/70 |
| 4 | 40/60 |
| 5 | 50/50 |
| 6 | 60/40 |
| 7 | 70/30 |
| 8 | 80/20 |
| 9 | 90/10 |
| 10 | 100/0 |

TABLE 5

| Oleophobicity index | Composition |
|---|---|
| 1 | Nujol |
| 2 | Nujol (50)/n-hexadecane (35) |
| 3 | n-hexadecane |
| 4 | n-tetradecane |
| 5 | n-dodecane |
| 6 | n-decane |
| 7 | n-octane |
| 8 | n-heptane |

The compositions are given by volume at 20° C.

Results

TABLE 6

| | Oleophobicity index | Hydrophobicity index |
|---|---|---|
| FC 396 (emulsion) | 4 | 4 |
| FC 396 (solvent) | 4 | 3 |
| AG 850 (emulsion) | 5 | 3 |
| AG 850 (solvent) | 5 | 2 |
| PHO 105 (emulsion) | 5 | 2 |
| PHO 105 (solvent) | 4 | 1 |
| PHO 107 (solvent) | 4 | 1 |
| PHO 107 (emulsion) | 4 | 1 |
| PHO 127 (solvent) | 6 | 3 |
| PHO 128 (solvent) | 4 | 1 |

XVIII.5. Physicochemical study 5.1. Weting of the deposits

The utility as a "dirt repellent" in terms of physicochemical properties can be summed up by the behavior of the deposit towards liquids (wetting) and its stability over time in contact with a liquid.

5.2. Methodology of the study

The following simple physicochemical study is carried out:

1* Deposition of the treatment polymer by plate whirler from 0.25% solutions of polymer. FC 396 (Scotchgard), a reference treatment, was also studied.

6 families of samples are studied on this basis—the sample "as such" or initial sample and a sample baked at 140° C. for 4 min. These 2 samples are then taken and subjected to:

either a "leaching" test consisting in allowing drops of water to fall from a height of 1 meter for 10 min (initial and washed, baked and washed), or an "immersion" test in demineralized water for 30 min (initial and immersed, baked and immersed).

The object of these 2 tests is obviously to find out the permanency of the treatment.

2* Measurement of the angle and its change over time (0 to 60 seconds) in contact with reference liquids (water and $CH_2I_2$).

The experiments were performed on the following products: PHO 105, PHO 107, PHO 127, FC 396 and the untreated PA66 control.

5.1.2. Results

Table 7 shows the angles obtained after 60 seconds.

TABLE 7

Change in the angles of test liquids on treated or untreated surfaces

| Sample | Control | PHO 105 | PHO 107 | PHO 127 | FC 396 |
|---|---|---|---|---|---|
| Initial | | | | | |
| $H_2O$ | 50° | 90° | 50° | 115° | 100° |
| $CH_2I_2$ | 30° | 70° | 90° | 90° | 50° |

TABLE 7-continued

Change in the angles of test liquids on treated or untreated surfaces

| Sample | Control | PHO 105 | PHO 107 | PHO 127 | FC 396 |
|---|---|---|---|---|---|
| Baked | | | | | |
| $H_2O$ | 50° | 90° | 90° | 112° | 110° or 75° |
| $CH_2I_2$ | 50° | 80° | 90° | 95° | 50° |
| Initial and washed | | | | | |
| $H_2O$ | | 100° | | 105° and 70° (1 point) | 103° |
| $CH_2I_2$ | | 70° | | 92° or 45° (1 point) | 45° |
| Baked and washed | | | | | |
| $H_2O$ | | 100° | | 110° | 110° or 80° |
| $CH_2I_2$ | | 85° | | 90° | 60° |
| Initial and immersed | | | | | |
| $H_2O$ | | 95° | | 112° | 112° |
| $CH_2I_2$ | | 80° | | 90° | 50° |
| Baked and immersed | | | | | |
| $H_2O$ | | 95° | | 116° | 112° |
| $CH_2I_2$ | | 70° | | 95° | 60° or 90° |

The conclusions are as follows:

* PHO 127 has a very high oleophobicity and hydrophobicity and remains relatively insensitive to baking and leaching.
* In general the fluorinated POS products according to the invention (PHO 105, 107, 127, 128) have a better leaching resistance than FC 396.
* It is not necessary to "overdose" with perfluorinated groups in order to obtain the hydrophobicity and oleophobicity properties. PHO 107, in which y=15, gives results after baking which are comparable to the other functionalized silicones containing perfluorinated monoester groups.

Example XIX

Synthesis of Novel Silicones Bifunctionalized at the Ends by Epoxide and Perfluoroalkyl Units, of the Following General Formula:

x preferably being 0.

This type of silicone bifunctionalized at the ends by epoxide units could be useful for rendering surfaces (wood, paper) or silicone-type matrices hydrophobic and oleophobic.

Preparation of:

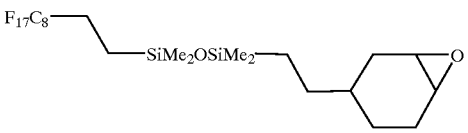

-a- 300 g of Vi-$C_8F_{17}$ (0.647 mol), 250 g of $HSiMe_2OSiMe_2SiH$ (1.866 mol) and 150 g of $M_2$ are introduced into a 1 l round-bottomed flask under nitrogen. 2 g of $Co_2CO_8$ (2857 ppm/total weight) are then added. The reaction is left to proceed for 48 h at 25° C. GC analysis shows that the degree of conversion of the Vi-$C_8F_{17}$ is close to 100%. The mixture is filtered on paper and the excess $M_2$ and $M'_2$ are evaporated off (100° C./50 mm Hg). The reaction mixture is distilled under a pump vacuum and 289 g of a colorless liquid (boiling point: 93° C./6 mm Hg) are recovered. The purity is >98% (GC). NMR and IR analyses confirm the structure of the product. Si—H content: 1.715 eq/kg (theory: 1.673 eq/kg). Yield isolated: 77%. The following is obtained:

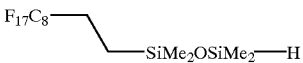

-b- 23 g of vinylcyclohexene epoxide (0.185 mol), 200 g of the previous product (GPE 1218)(0.34 mol) and 50 g of dry toluene are introduced into a 100 ml round-bottomed flask under nitrogen. 10 ppm of platinum/total weight are then added in the form of a Karstedt catalyst. The mixture is heated at 90° C. for 24 h. The degree of conversion of the Si—H units is close to 100%. The solvent and excess VCMX are evaporated off. 225 g of a yellowish oil are recovered whose structure is confirmed by NMR and IR analyses. The purity is >98%. The α-perfluorinated and ω-epoxidized dimethyldisiloxane of the formula given above is obtained.

What is claimed is:

1. A compound of the formula:

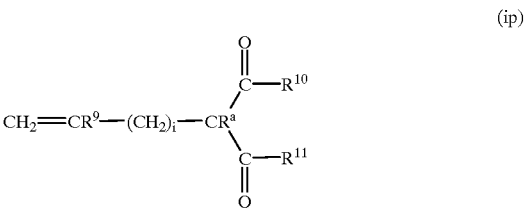

(ip)

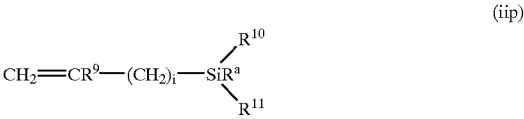

(iip)

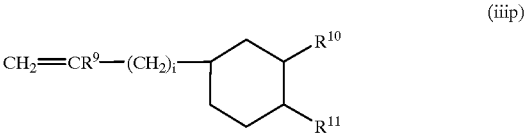

(iiip)

wherein $R^a$ and $R^9$ independently are H or linear or branched $C_1$–$C_6$-lower alkyl;

$R^{10}$ and $R^{11}$ independently are OH, linear or branched $C_1$–$C_6$-alkoxy or —$(Z_3)_j$—Rf, at least one of the radicals $R^{10}$ and $R^{11}$ being —$(Z_3)_j$—Rf;

i is 0 to 10, $Z_3$ is is a divalent radical of the formula XIII $$—U—C_nH_{2n}— \quad (XIII)$$

wherein $n \geq 1$ and U is O, S, NH, or $NHSO_2$,

Rf is a perhalogenated group or a linear or branched fluoroalkyl radical having one of the formulae:

$$—C_qF_{2q}—CF_3$$

wherein $q \geq 0$;

$$—C_qF_{2q}—H$$

wherein $q \geq 1$;

$$—NR^{rf}SO_2C_qF_{2q}—CF_3$$

wherein $q \geq 0$ and $R^{rf}$=H, aryl or linear or branched $C_1$–$C_6$-lower alkyl; and j=0 or 1.

2. The compound of claim 1 of the formula (iiip) wherein the cyclohexyl ring is substituted at 1 to 3 additional places.

* * * * *